US006850891B1

(12) United States Patent
Forman

(10) Patent No.: US 6,850,891 B1
(45) Date of Patent: Feb. 1, 2005

(54) METHOD AND SYSTEM OF CONVERTING DATA AND JUDGEMENTS TO VALUES OR PRIORITIES

(76) Inventor: Ernest H. Forman, 1438 Ironwood Dr., McLean, VA (US) 22101

( * ) Notice: Subject to any disclaimer, the term of this patent is extended or adjusted under 35 U.S.C. 154(b) by 0 days.

(21) Appl. No.: 09/625,484

(22) Filed: Jul. 23, 2000

Related U.S. Application Data

(60) Provisional application No. 60/145,470, filed on Jul. 23, 1999.

(51) Int. Cl.[7] .............................................. G06F 17/60
(52) U.S. Cl. ......................................................... 705/7
(58) Field of Search .................... 705/1, 7, 10; 700/99, 700/100, 101

(56) References Cited

U.S. PATENT DOCUMENTS

| | | | |
|---|---|---|---|
| 4,613,946 A | 9/1986 | Forman | 364/518 |
| 5,090,734 A | 2/1992 | Dyer et al. | 283/67 |
| 5,227,874 A | 7/1993 | Von Kohorn | 358/84 |
| 5,312,114 A | 5/1994 | Lipson | 273/434 |
| 5,321,833 A | 6/1994 | Chang et al. | 395/600 |

(List continued on next page.)

FOREIGN PATENT DOCUMENTS

JP      406251098 A   *   9/1994

OTHER PUBLICATIONS

Thomas L. Saaty, Decision Marking for Leaders, "The Analytical Hierarchy Process for Decisions in a Complex World", University of Pittsburg, pp. 74–121, 1988.*

(List continued on next page.)

*Primary Examiner*—Hani M. Kazimi
(74) *Attorney, Agent, or Firm*—David G. Grossman

(57) ABSTRACT

The subject invention comprises methods for developing a decision hierarchy and including data as well as judgments in the evaluation of alternatives. Using a preferred embodiment of the subject invention, data for alternatives with respect to covering objectives in a decision hierarchy can be mapped into ratio scale preferences using linear increasing or decreasing functions, non-linear concave or convex increasing or decreasing functions, in conjunction with either-or interval step function scales, verbal intensity rating scales, or directly applied value scores. Upper and lower bounds can also be specified over which these functions are defined. Qualitative data, such as ratings or step scale intervals, can be mapped into a preference scale by making pair-wise comparisons to assess the ratings' intensities. Data can also applied in two other contexts: (1) as a screen to eliminate alternatives that do not satisfy one or more conditions which are defined as musts by the user; and (2) to assign and derive value scores for their corresponding covering objectives. User priorities that were captured by delivering comparisons between objectives are brought together with the data by synthesizing it with respect to all covering objectives and their representative value scores for each alternative. The final result is either a set of alternatives ranked by their total value score, which can be used for allocations or optimizations, or a single top scoring alternative if the goal is to select the best alternative—the remainder of the alternatives are ranked with respect to their difference from the top performer.

18 Claims, 32 Drawing Sheets

U.S. PATENT DOCUMENTS

| | | | | |
|---|---|---|---|---|
| 5,325,533 | A | 6/1994 | McInerney et al. | 395/700 |
| 5,432,887 | A | 7/1995 | Khaw | 395/11 |
| 5,559,945 | A | 9/1996 | Beaudet et al. | 395/156 |
| 5,566,291 | A | 10/1996 | Boulton et al. | 395/161 |
| 5,621,905 | A | 4/1997 | Jewson et al. | 395/353 |
| 5,625,781 | A | 4/1997 | Cline et al. | 395/335 |
| 5,630,120 | A | 5/1997 | Vachey | 395/602 |
| 5,644,736 | A | 7/1997 | Healy et al. | 395/341 |
| 5,644,740 | A | 7/1997 | Kiuchi | 395/357 |
| 5,657,437 | A | 8/1997 | Bishop et al. | 395/764 |
| 5,710,833 | A | 1/1998 | Moghaddam et al. | 382/228 |
| 5,754,738 | A | 5/1998 | Saucedo et al. | 395/12 |
| 5,758,026 | A | 5/1998 | Lobley et al. | 395/12 |
| 5,774,121 | A | 6/1998 | Stiegler | 345/354 |
| 5,784,539 | A | 7/1998 | Lenz | 395/50 |
| 5,787,411 | A | 7/1998 | Groff et al. | 707/2 |
| 5,799,298 | A | 8/1998 | Bingham et al. | 707/1 |
| 5,832,212 | A | 11/1998 | Cragun et al. | 395/188.01 |
| 5,835,902 | A | 11/1998 | Jannarone | 706/26 |
| 5,844,817 | A | 12/1998 | Lobley et al. | 364/578 |
| 5,847,708 | A | 12/1998 | Wolff | 345/349 |
| 5,912,696 | A | 6/1999 | Buehl | 348/5.5 |
| 5,913,211 | A | 6/1999 | Nitta | 707/5 |
| 5,933,145 | A | 8/1999 | Meek | 345/348 |
| 5,995,728 | A | 11/1999 | Forman | 395/500 |
| 6,151,565 | A * | 11/2000 | Lobley et al. | 703/2 |

OTHER PUBLICATIONS

Julian W. Vincze, Software Review. "Expert Choice", School of Business at Rollins College, pp. 10–12, Mar. 1990.*

Michael W. Herman et al., "A Monte Carlo study of pairwise comparison", Elsevier Science B.V., Information Processing Letters 57 (1996) pp. 25–29.

Chia–Hui Chang et al., "Customizable multi–engine search tool with clustering", Elsevier Science B.V., Computer Networks and ISDN Systems 29 (1997) pp. 1217–1223.

Björn T. Jònsson et al., "Interaction of Query Evaluation and Buffer Management for Information Retrieval", SIGMOD 98, vol. 27, Issue 2, Jun. 1998, pp. 118–129.

H. Taira et al., "A Method of Constructing pairwise Comparison Matrix in Decision Making", 1996 IEEE International Conference on Systems, Man and Cybernetics, vol. 4 of 4, Oct. 14–17, 1996, pp. 2511–2516.

Pedro P. Sanchez et al., "Information concepts and Pairwise comparison matrices", Elsevier Sciences B.V., Information Processing Letters 68 (1998) pp. 185–188.

Chia–Hui Chang et al., "Enabling Concept–Based Relevance Feedback for Information Retrieval on the WWW", 1999 IEEE Transactions on Knowledge and Data Engineering, vol. 11, No. 4, Jul./Aug. 1999 pp. 595–605.

K. Voigt, "SKIPPER: A Tool that Lets Browsers Adapt to Changes in Document Relevance to Its User", 1996 IEEE Sixth International Workshop on Research Issues in Data Engineering, pp. 61–68.

Joakim Eriksson et al., "SICS MarketSpace—An Agent–Based Market Infrastructure", Agent Mediated Electronic Commerce, May 10, 1998, pp. 41–53.

Thomas L. Saaty, "A Scaling Method for Proiorities in Hierarchical Structures", J. Math Psychology, vol. 15, No. 3, Jun. 1977, pp 234–281.

Patrick T. Harker, "The Theory of Ratio Scale Estimation: Saaty's Analytic Hierarchy Process", Management Science, vol. 33, No. 14, Nov. 1987, pp. 1383–1403.

T.L. Saaty, The Analytic Hierarchy Process: Planning, Priority Setting, Resource Allocation, McGraw–Hill, 1980, Table of Contents & Preface.

P.T.Harker, "Alternative Modes of Questioning in the Analytic Hierarchy Process", Math Modeling, vol. 9, No. 3–5, 1987, pp. 353–360.

E. H. Forman et al., "Team Expert Choice Advanced Group Decision Support Software User Manual," Introduction to Modeling, pp. 353–394, 1998.

Thomas L. Saaty, "Fundamentals of Decision Making and Priority Theory with the Analytic Hierarchy Process", vol. 6; pp. 224–335, 2000.

Thomas L. Saaty, Decision Making For Leaders, The Analytic Hierarchy Process for Decisions in a Complex World pp. 1–51 and 119–151, 1999–2000.

* cited by examiner

Diagram 1A – Conceptual Overview

Diagram 1B – System Relationships

Diagram 2 – Application Delivery

Diagram 3 – Building a Hierarchy

Diagram 5 – Applying Rating Scales and Their Assessment

Diagram 7 – Step by Step Conversion and Synthesis

Diagram 7 – Data Transformation

701 Raw data either inputed by user or retrieved from users current system

| Alt ID | Alternative | Covering Obj 1 | Covering Obj 2 | Covering Obj 3 | Covering Obj 4 | Covering Obj 5 |
|---|---|---|---|---|---|---|
| A01 | Option One | 34 | 43 | Good | 5 | 0.34 |
| A02 | Option Two | 23 | 54 | Fair | 8 | 0.67 |
| A03 | Option Three | 78 | 98 | Poor | 2 | 0.12 |

702 Rating Scales and Their Associated Intensities and Formulas

| | Rating Scale Type | Low / I1 | High / I2 | Curve / I3 | I4 |
|---|---|---|---|---|---|
| Covering Obj 1 | Increasing Utility Curve | 0 | 100 | 2.93E-01 | |
| Covering Obj 2 | Decreasing Utility Curve | 10 | 100 | -2.16E-01 | |
| Covering Obj 3 | Ratings Scale | Very Good =1.0 | Good = .76 | Fair = .19 | Poor = .05 |
| Covering Obj 4 | Step Scale | .06 <= 3 | .19 <= 6 | .27 <= 9 | 1.0 <= 12 |
| Covering Obj 5 | Direct Ratings | | | | |

703 Converted Row Data in the Form of Vallue Scores

| Alt ID | Alternative | Covering Obj 1 | Covering Obj 2 | Covering Obj 3 | Covering Obj 4 | Covering Obj 5 |
|---|---|---|---|---|---|---|
| A01 | Option One | 0.5 | 0.45 | 0.76 | 0.19 | 0.34 |
| A02 | Option Two | 0.12 | 0.31 | 0.19 | 0.27 | 0.67 |
| A03 | Option Three | 0.85 | 0.05 | 0.05 | 0.06 | 0.12 |

704 Synthesis Mathematic Matrix

| Alt ID | Alternative | Total | Covering Obj 1 Global Priority (.21) | Covering Obj 2 Global Priority (0.5) | Covering Obj 3 Global Priority (.12) | Covering Obj 4 Global Priority (.30) | Covering Obj 5 Global Priority (.32) |
|---|---|---|---|---|---|---|---|
| A01 | Option One | Sum(Row1) | (0.5)(.21) | (.45)(.05) | (.76)(.12) | (.19)(.30) | (.34)(.32) |
| A02 | Option Two | Sum(Row2) | (.12)(.21) | (.31)(.05) | (.19)(.12) | (.27)(.30) | (.67)(.32) |
| A03 | Option Three | Sum(Row3) | (.85)(.21) | (.05)(.05) | (.05)(.12) | (.06)(.30) | (.12)(.32) |

705 Final Scores after Synthesis

| Alt ID | Alternative | Total | Covering Obj 1 Global Priority (.21) | Covering Obj 2 Global Priority (.05) | Covering Obj 3 Global Priority (.12) | Covering Obj 4 Global Priority (.30) | Covering Obj 5 Global Priority (.32) |
|---|---|---|---|---|---|---|---|
| A01 | Option One | 0.3845 | 0.105 | 0.0225 | 0.0912 | 0.057 | 0.1088 |
| A02 | Option Two | 0.3589 | 0.0252 | 0.0155 | 0.0228 | 0.081 | 0.2144 |
| A03 | Option Three | 0.2434 | 0.1785 | 0.0025 | 0.006 | 0.018 | 0.0384 |

FIG. 7

Diagram 8 – AHP Mathematics

A Paired Comparison is Conducted on Objectives or Sub-Objectives
(The ratio of the lengths of the graphical lines is recorded with respect to the criteria compared)

| Objective A | $S_1$ = The length of bar 1 | With A being the ratio of the first |
|---|---|---|
| Objective B | $S_2$ = The length of bar 2   $S_1/S_2 = A_{1,2}$ | instance of $S_1$ to the final instance of $S_2$ |

At this point the user either conducts a set of pairwise comparisons for all of the objectives or the user chooses to load the results of previous pairwise comparisons into their decision to populate the upper right side of this matrix

| Matrix of Comparisons | Objective A | Objective B | Objective C | Objective N | Resulting Priority Eigenvector | |
|---|---|---|---|---|---|---|
| Objective A | $A_{1^1,1^1}$ | $A_{1^2,2^1}$ | $A_{1^3,3^1}$ | $A_{1^n,n^n}$ | Normalized Eigenvector of A=$PE_A$ | A |
| Objective B | $A_{2^1,2^1}$ | $A_{2^2,2^2}$ | $A_{2^3,3^2}$ | $A_{2^n,n^n}$ | Normalized Eigenvector of B=$P_BE$ | B |
| Objective C | $A_{3^1,1^1}$ | $A_{3^2,2^3}$ | $A_{3^3,3^3}$ | $A_{3^n,n^n}$ | Normalized Eigenvector of C=$P_CE$ | C |
| Objective N | $A_{n^n,1^n}$ | $A_{n^n,2^n}$ | $A_{n^n,3^n}$ | $A_{n^n,n^n}$ | Normalized Eigenvector of N=$PE_N$ | Num |

The ratios represented in gold boxes are the results of the pairwise comparisons. Whether they were completed by the user or loaded from the database does not matter.

The ratios in the gray boxes are populated by the software and will all equal one because they are a length divided by themselves.

The ratios in the heavy bordered boxes are calculated and populated by the software. They are the reciprocal of their opposite box. (X,Y) to (Y,X)

Checking for inconsistency

Once all of the pairwise comparisons have been calculated into priorities AHP allows for the checking of consistency of the comparisons. It is important to note that a high inconsistency does not invalidate a decision, it simply shows a break from conventional logic. The measure of consistency is displayed as normalized number between 0 and 1. The closer to 0 the more consistent the matrix is the closer to 1 the more inconsistent. Expert Choice displays the results of this calculation as an inconsistentcy ration with the higher value the greater the inconsistency.

The consistency index is defined as: $(N_{MAX}-n)/(n-1)$ $N_{MAX}$ is calculated by applying the following steps to the table.

Matrix of Comparisons

| | Objective A | Objective B | Objective C | Row Sums | Avg. Row Sums |
|---|---|---|---|---|---|
| Objective A | $A_{1^1,1^1}/Sum(Col\ A)$ | $A_{1^2,2^1}/Sum(Col\ B)$ | $A_{1^3,3^1}/Sum(Col\ N)$ | $Sum(RowA)=Row_1$ | $Row_1/N=ARow_1$ |
| Objective B | $A_{2^1,1^2}/Sum(Col\ A)$ | $A_{2^2,2^2}/Sum(Col\ B)$ | $A_{2^3,3^2}/Sum(Col\ N)$ | $Sum(RowB)=Row_2$ | $Row_2/N=ARow_2$ |
| Objective C | $A_{3^1,1^3}/Sum(Col\ A)$ | $A_{3^2,2^3}/Sum(Col\ B)$ | $A_{3^3,3^3}/Sum(Col\ N)$ | $Sum(RowC)=Row_3$ | $Row_3/N=ARow_3$ |

Now we must calculate the average of the entries

Matrix of Comparisons

| | Objective A | Objective B | Objective N | Normalized Row Sums | Priority Vectors |
|---|---|---|---|---|---|
| Objective A | $(A_{1^1,1^1})ARS_1$ | $(A_{1^2,2^1})ARS_1$ | $(A_{1^n,N^n})ARS_1$ | $Sum(Row\ A)=NRow_1$ | $NRow_1/ARS_1=PV_1$ |
| Objective B | $(A_{2^1,1^2})ARS_2$ | $(A_{2^2,2^2})ARS_2$ | $(A_{2^n,N^n})ARS_1$ | $Sum(Row\ B)=NRow_2$ | $NRow_2/ARS_2=PV_2$ |
| Objective N | $(A_{N^n,1^n})ARS_n$ | $(A_{N^n,2^n})ARS_n$ | $(A_{N^n,N^n})ARS_n$ | $Sum(Row\ N)=NRow_n$ | $NRow_3/ARS_3=PV_n$ |

FIG. 8

Diagram 9 – ExpertChoice Entity Relationship Diagram

Screen Shot 9 – Rating Scale Creating Tool

Y=f(x)

Goal: Defines final objective of decision\Top Level Objective \Sub-Objective\Covering Objective | Sort | Assess | Close

| Intensity Name | Priority |
|---|---|
| Very Good | 0 |
| Good | 0 |
| Fair | 0 |
| Poor | 0 |

Fair
Good
Poor
Very Good (Needs re-extraction) Ratings – Define and derive ratio scale priorities for intensities.

FIG. 18

Screen Shot 10 – Step Scale Creating Tool

Goal: Defines final objective of decision\Top Level Objective \Sub-Objective\Covering Objective

| Intensity Name | Step LB | Priority |
|---|---|---|
| Top Bound | 100 | 0 |
| Upper Tertile | 65 | 0 |
| Middle Tertile | 35 | 0 |
| Lower Tertile | 12 | |

(Needs re-extraction) Steps – Define Steps and derive ratio scale priorities for intensities.

FIG. 19

Screen Shot 11 – Data Grid Showing Value Scores

| | Ideal Mode | | VALUES | | | | | |
|---|---|---|---|---|---|---|---|---|
| | | | INCR | RATINGS | STEP | DIRECT | INCR | DECR |
| | | Total | Top Level Objective Sub-Objective Covering Objective | Top Level Objective Sub-Objective Covering Objective | Top Level Objective Sub-Objective Covering Objective | Top Level Objective Sub-Objective Covering Objective | Top Level Objective Sub-Objective Covering Objective | Top Level Objective Sub-Objective Covering Objective (L:.161) |
| AID | Alternative | | | | | | | |
| A1 | Alt One | .679 | .646 | 1.0 | .333 | .45 | .6 | .991 |
| A2 | Alt Two | .574 | .911 | 1.0 | .111 | .23 | .8 | .472 |
| A2 | Alt Three | .472 | .054 | .25 | .037 | .98 | 1.0 | .997 |

FIG. 20

Screen Shot 12 – Data Grid Showing Selection for Extraction

| | Ideal Mode | | | | | | | |
|---|---|---|---|---|---|---|---|---|
| | | | INCR | RATINGS | STEP | DIRECT | INCR | DECR |
| AID | Alternative | Total | Top Level Objective Sub-Objective Covering Objective (L:.250) | Top Level Objective Sub-Objective Covering Objective (L:.750) | Top Level Objective Sub-Objective Covering Objective (L:.339) | Top Level Objective Sub-Objective Covering Objective (L:.401) | Top Level Objective Sub-Objective Covering Objective (L:.099) | Top Level Objective Sub-Objective Covering Objective (L:.161) |
| A2 | ☑ Alt One | .679 | 45 | Very Good | 78 | .45 | 3 | 23 |
| A2 | ☑ Alt Two | .574 | 78 | Good | 40 | .23 | 4 | 89 |
| A2 | ☑ Alt Three | .472 | 12 | Poor | 24 | .98 | 5 | 12 |

FIG. 21

| Expert Choice Retire1b.AHP Facilitator | | | | | | |
|---|---|---|---|---|---|---|
| File Edit View Go Tools Formula Type Help | | | | | | |
| Alternative | MONEY \SAL | MONEY \UTIL | MONEY \HEA | MONEY \TRA | MONEY \FOO | MON |
| Aiken S.C. | | | | | | |
| Alamogordo N.M. | | | | | | |
| Albuquerque N.M. | | | | | | |
| Alpine-Big Ben TX | | | | | | |
| Amador County CA | | | | | | |
| Amherst-Northampton, MA | | | | | | |
| Anapolis MD | | | | | | |
| Ashville N.C. | | | | | | |
| Athens GA | | | | | | |
| Austin TX | | | | | | |
| Bar Harbor ME | | | | | | |
| Bellingham WA | | | | | | |
| Boca Raton Del/Ray FL | | | | | | |
| Bransom MO | | | | | | |
| Carmel/Monterey/Pebble Beach CA | | | | | | |
| Carson City NV | | | | | | |
| Chapel Hill NC | | | | | | |
| Charlottesville VA | | | | | | |

| Intensity Name | | Priority |
|---|---|---|
| <=75% | :less than or e | 1.000 |
| 85% | :between 75 ar | .920 |
| 95% | :100% of natl av | .840 |
| 100% | :100% = 80 poir | .800 |
| 115% | :115% = 68 poir | .680 |
| 135% | :135% = 52 poir | .520 |
| 150% | :150% = 40 poir | .400 |
| 175% | :175% = 20 poir | .200 |
| 200% | :200% or more | .000 |

Ratings – Define and derive ratio scale priorities for intensities.

METHOD AND SYSTEM OF CONVERTING DATA AND JUDGEMENTS TO VALUES OR PRIORITIES

This application claims the benefit of Provisional application Ser. No. 60/145,470, filed Jul. 23, 1999.

FIELD OF THE INVENTION

The subject invention is directed to decision processing, and more particularly to converting raw data and judgments into value scores and priorities.

BACKGROUND

There is a significant body of work related to decision processing that can be used to improve decision processing computer systems. See, e.g., T. L. Saaty, *A Scaling Method for Priorities in Hierarchical Structures*, 15 J. Math Psychology 234 (1977); P. T. Harker & L. G. Vargas, *Theory of Ratio Scale Estimation: Saaty's Analytic Hierarchy Process*, 33 Management Science 1383 (1987); F. Zahedi, *The Analytic Hierarchy Process—a Survey of the Method and Its Applications*, 16 Interfaces 96 (1986); T. L. Saaty, The Analytic Hierarchy Process (1980) (hereinafter Saaty 1980); E. H. Forman, *Decision Support for Executive Decision Makers*, 1 Information Strategy: The Executives Journal, Summer 1985; P. T. Harker, *Alternative Modes of Questioning in the Analytic Hierarchy Process*, 9 Math Modeling 353 (1987); Forman, E. H., Saaty, T. L., Selly, M. A., & Waldron, R., *Expert Choice*, Decision Support Software, McLean, Va., 1983; M. Gondran, M. Minoux, *Graphs and Algorithms*, Search for the connected component containing the vertex algorithm, at 15; T. L. Saaty, *Decision Making for Leaders*, 1995/1996 Edition, RWS Publications, Pittsburgh, Pa. (1985); and T. L. Saaty, *Fundamentals of Decision Making and Priority Theory*, Vol. 6, RWS Publications, Pittsburgh, Pa. (1994). All of the above publications are incorporated herein by reference.

Computer-based decision making is preferably hierarchy-based. For example, the Analytic Hierarchy Process (AHP) is a widely used method for decision making, as well as for prioritization and forecasting. For example, construction of a decision hierarchy can be achieved by utilizing a process of identifying pros and cons, then converting the pros and cons into objectives (see U.S. Pat. No. 5,995,728, incorporated herein by reference).

A constant and inherent problem in computer-based decision making is converting raw data to accurate and specific value scores that represent the inherent perceptions of relative value as held by all the associated and participating users. This is a task that has previously required constant and extensive human intervention, which resulted in the application of arbitrary scales and biased conversions, leading to tainted results with value scores that were essentially no more accurate than if they had been created using a random number generator. The other equally difficult and consistently inaccurate aspect of computer-based decision making that required constant human intervention, and that brought with it unjustified inputs and structural bias, is the capture and conversion of individuals or group judgments in order to derive priorities.

SUMMARY

The disclosed embodiments comprise computer methods for developing a decision hierarchy (including data as well as judgments in the evaluation of alternatives). Using a preferred embodiment of the subject invention, data for alternatives with respect to covering objectives in a decision hierarchy can be mapped into ratio scale preferences using either linear increasing or decreasing functions, non-linear concave or convex increasing or decreasing functions, or step functions. Upper and lower bounds can also be specified over which these functions are defined. Qualitative data, such as ratings, can be mapped into a preference scale by making pair-wise comparisons of the rating intensities. Data can also applied in two other contexts: (1) as a screen to eliminate alternatives that do not satisfy one or more "must" conditions; and (2) to derive priorities for covering objectives when all sibling covering objectives represent sub-dimensions of a well-defined quantitative scale.

The disclosed embodiments apply the strict rules and academically proven methods of the Analytic Hierarchy Process, via a multi-platform software application, to guide a user through structured and valid comparisons which lead to accurate and specific priorities.

By using AHP to calculate and then synthesizing comparisons, or judgments, that express the strength of importance, preference, or likelihood of one element over another with respect to a parent node—the node immediately above in the hierarchy (see U.S. Pat. No. 4,613,946 for definitions of nodes, trees, etc.)—the disclosed method combines the value scores together with a user's priorities, which are the result of the calculated and synthesized judgments, to produce an accurately ranked set of alternatives.

BRIEF DESCRIPTION OF THE DRAWINGS

FIG. 7 illustrates data transformation in a preferred embodiment.

FIG. 8 describes an AHP-based method.

FIG. 18 depicts a rating scale creating tool.

FIG. 19 depicts a step scale creating tool.

FIG. 20 depicts a data grid showing value scores.

FIG. 21 depicts a data grid showing selection for extraction.

FIG. 26 depicts a values grid.

FIG. 28 depicts a rating screen.

DETAILED DESCRIPTION OF THE INVENTION

A preferred embodiment of the subject invention comprises a series of processes that when implemented as a system create an application that converts raw data and judgments into value scores and priorities.

In a preferred embodiment, a hierarchy of elements is constructed. The elements are to be prioritized using hard data and judgment. The hierarchy might represent a decision and could contain players, scenarios, objectives, sub-objectives, sub-sub-objectives and other levels, alternatives, and other information. The hierarchy might represent a forecast and contain influencing factors, players, or scenarios. In a preferred embodiment, the hierarchy of elements is constructed using either a top down or bottom up approach, or a combination of both by dragging and dropping elements.

For the construction of a decision hierarchy, identifying pros and cons, and converting the pros and cons into objectives, see U.S. Pat. No. 5,995,728, to Forman, the contents of which are incorporated herein by reference. The hierarchy can be displayed in a concise manner, with the complete path from a given element back to the root element always visible (see U.S. Pat. No. 4,613,946, to Forman, the contents of which are incorporated herein by reference).

The following describes a preferred embodiment in greater detail.

Figure 1A:
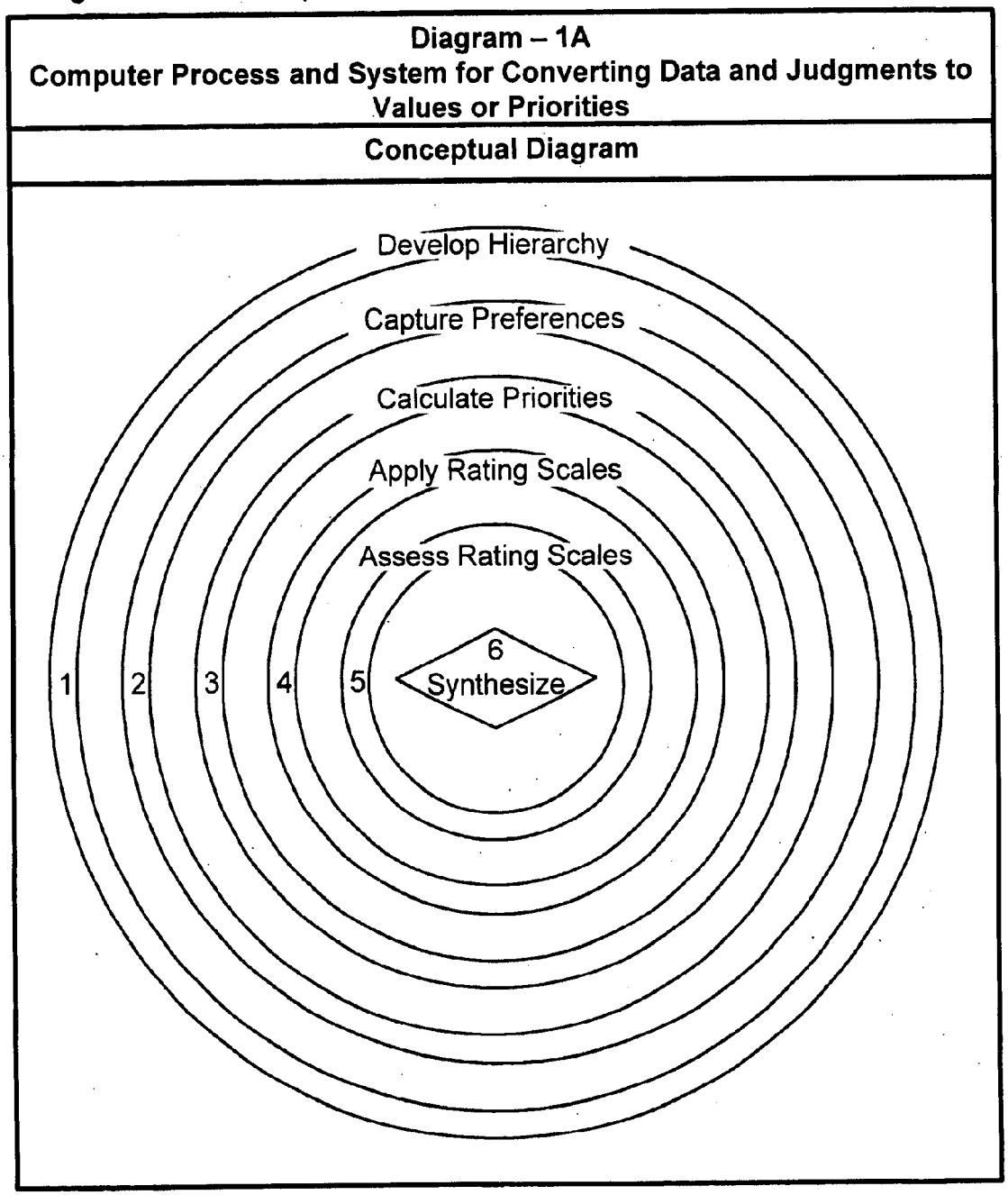
FIG. 1A depicts a conceptual overview of a preferred embodiment.

FIG. 1A depicts a diagram that represents the highest level view of the process and system and the sequential relationship necessary for data and human judgments to be converted to value scores. The outermost ring 1 represents the need to develop a hierarchy to structure both data and judgments so that a series of relationships may be formed. The next ring 2 represents the process of delivering comparisons to extract a user's judgments, in order to calculate the user's preferences. This is done by using one of three graphical user interfaces to record the relative level of importance or preference between two objectives, in numeric ratio form. Once the ratios are stored, the process then calculates priorities 3. This entails the use of the Analytical Hierarchy Process (AHP) (see, FIG. 8). Then the data is addressed and the user selects rating scales to be applied to the incoming data feeds 4. Once rating scales are selected, the user needs only to indicate the boundaries of the appropriate scale and assess their priorities 5 by using the same graphical pair-wise interface as in 2. The final step is the synthesis of the converted data and the calculated user's priorities and by synthesizing 6 computes a total value score, either in a distributive fashion or with respect to the top performer in an ideal mode.

Figure 1B:
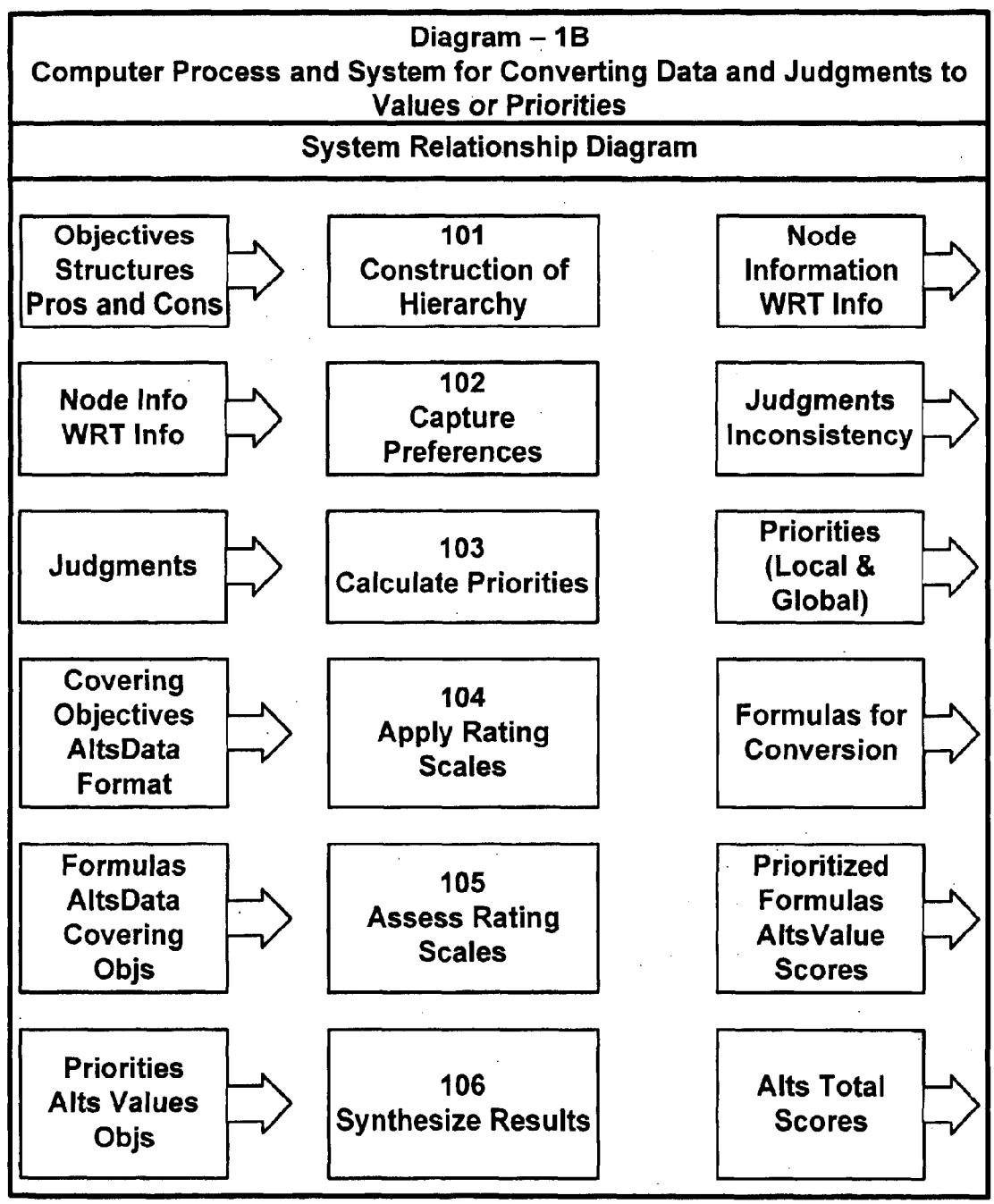
FIG. 1B depicts a system relationship diagram for a preferred computer process and system for converting data and judgments to values or priorities.

FIG. 1B highlights the essential data flows that occur between the steps of the process. In the first step 101, the construction of the hierarchy, a preferred software application is provided objectives, structure rules, and pros and cons, as a user deems necessary. Once this hierarchy is constructed, node information and structure data is stored with the relationship to the corresponding parent node, or "with respect to" (WRT) references are stored. These results become the direct inputs for step 102, the capture of the user's preferences via the delivery of comparisons, which produces judgments and an inconsistency number (a more detailed explanation of these concepts can be found in U.S. patent application Ser. No. 09/396,215, filed Sep. 15, 1999, titled METHOD AND SYSTEM FOR NETWORK-BASED DECISION PROCESSING, to Saaty et al.), the contents of which are incorporated here by reference. Judgments then flow into step 103, which applied AHP and calculates the priorities. These priorities are held in a database until they are needed for synthesis (see FIG. 7). The user then initiates a step 104, application of rating scales, which requires the covering objectives and raw data format. After this step is complete, the application has the formulas with their intensities and boundaries necessary for the assessment at step 105 that produces converted alternative value scores. After all these steps are complete and their results loaded into the database, at step 106 synthesis can occur, resulting in a ranked list of alternatives and associated value scores.

Figure 2:
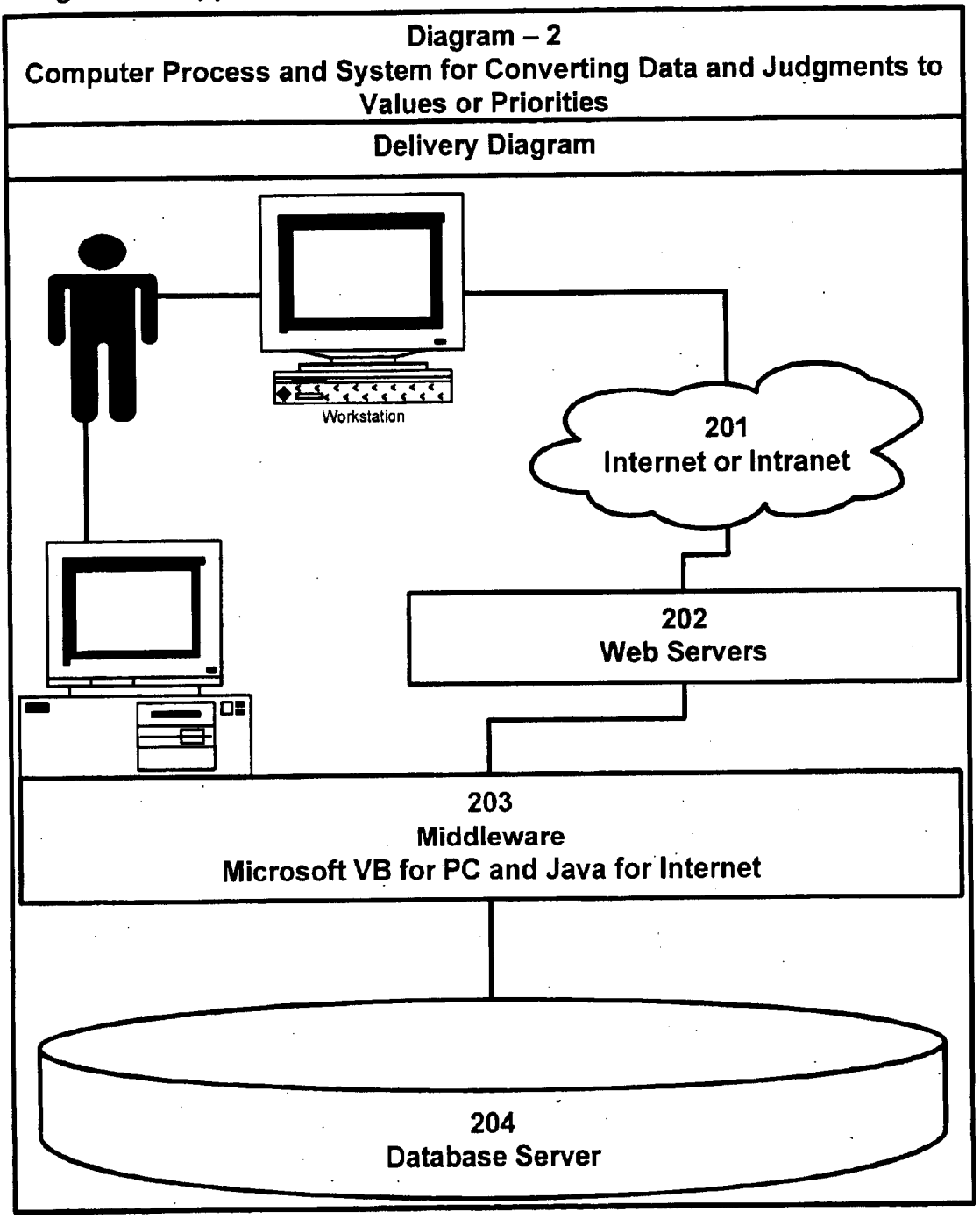
FIG. 2 depicts a delivery diagram for a preferred computer process and system for converting data and judgments to values or priorities.

FIG. 2 depicts an overview of delivery of the software application. For a user of a software application directed to a preferred embodiment of the subject method, the Internet or an intranet 201 is the preferred medium for delivery. Sending the application out and receiving it from the Internet is a set of web servers 202, which do not need to be platform dependent. Middleware 203 differs based on the medium with which the user interacts with the application. The Internet version is preferably coded in Java and the PC in Visual Basic; both sets of middleware are serviced by a database 204.

Figure 3:
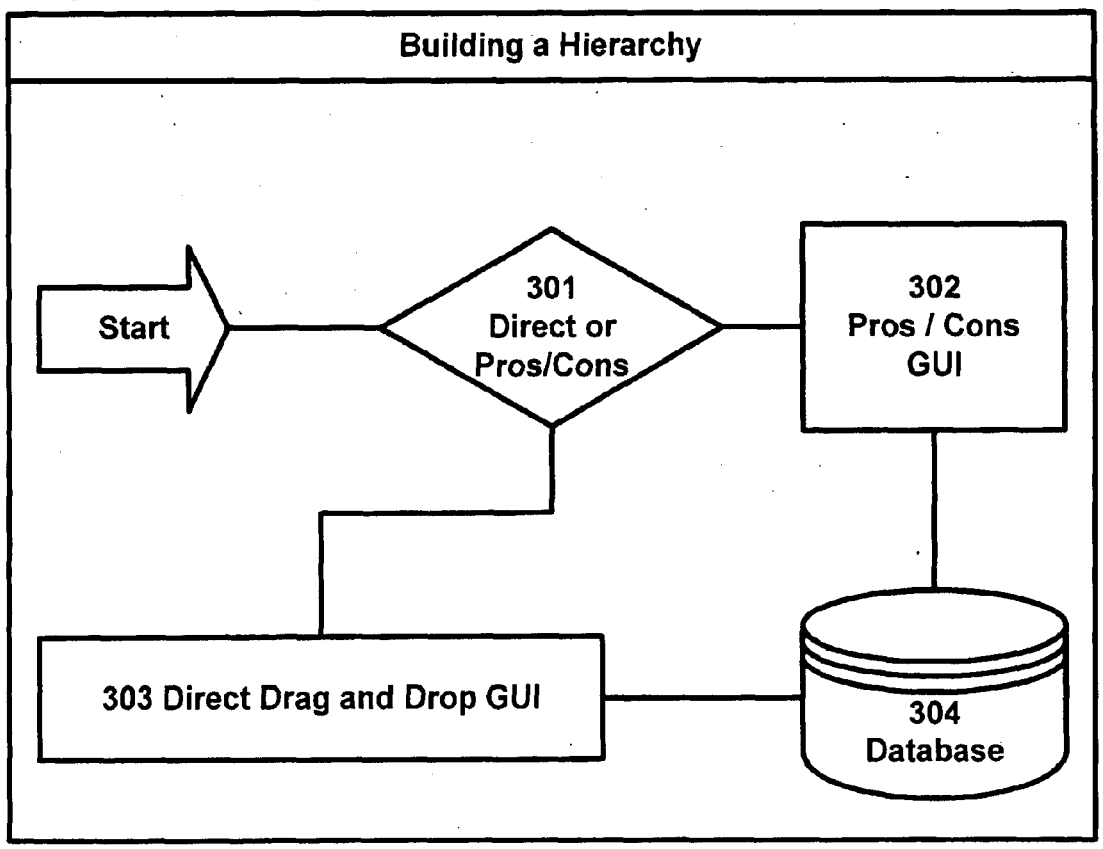
FIG. 3 depicts a preferred process for building a hierarchy.
Figure 9:
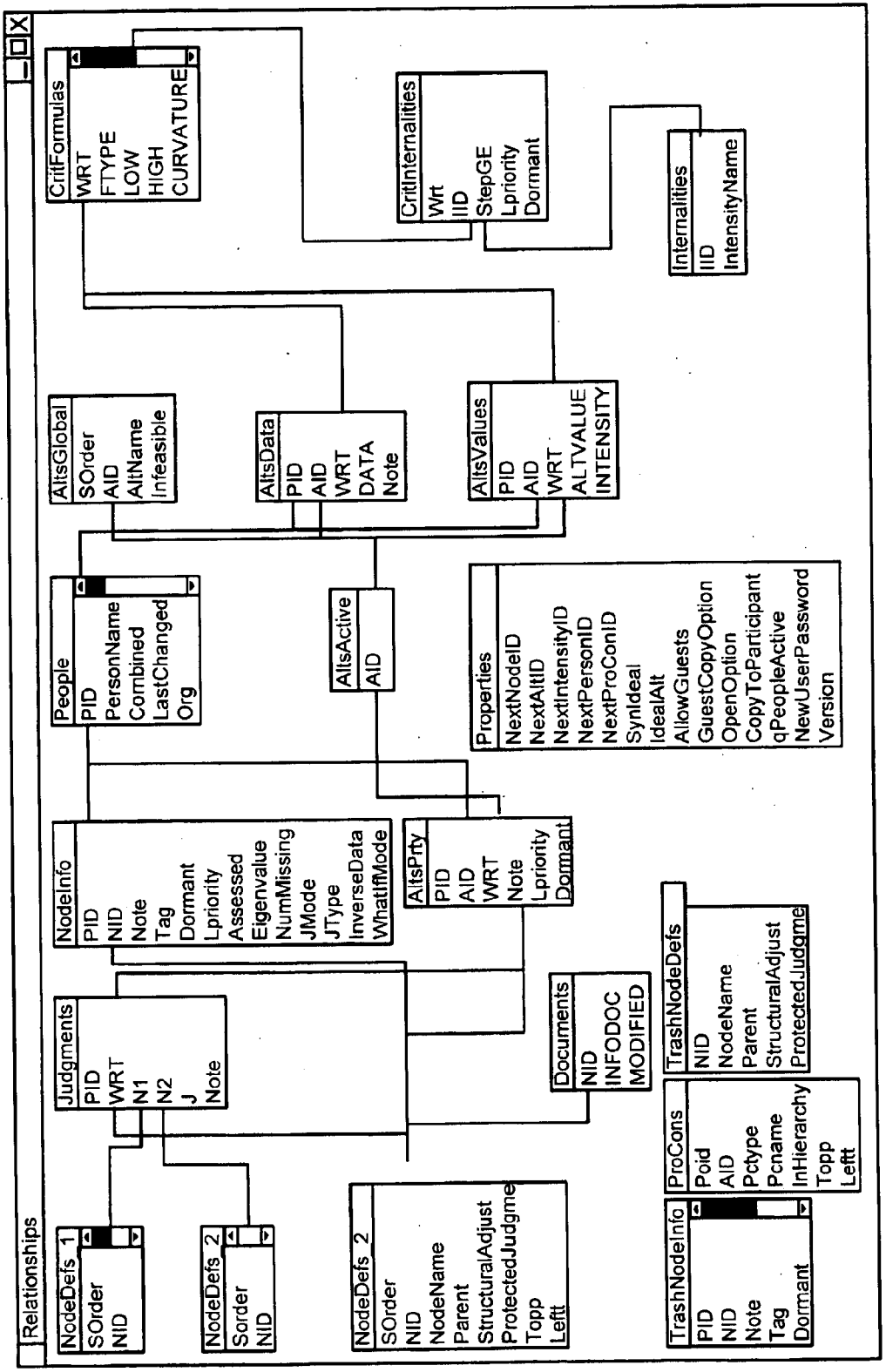
FIG. 9 depicts entity relationships of a preferred embodiment.
Figure 10:
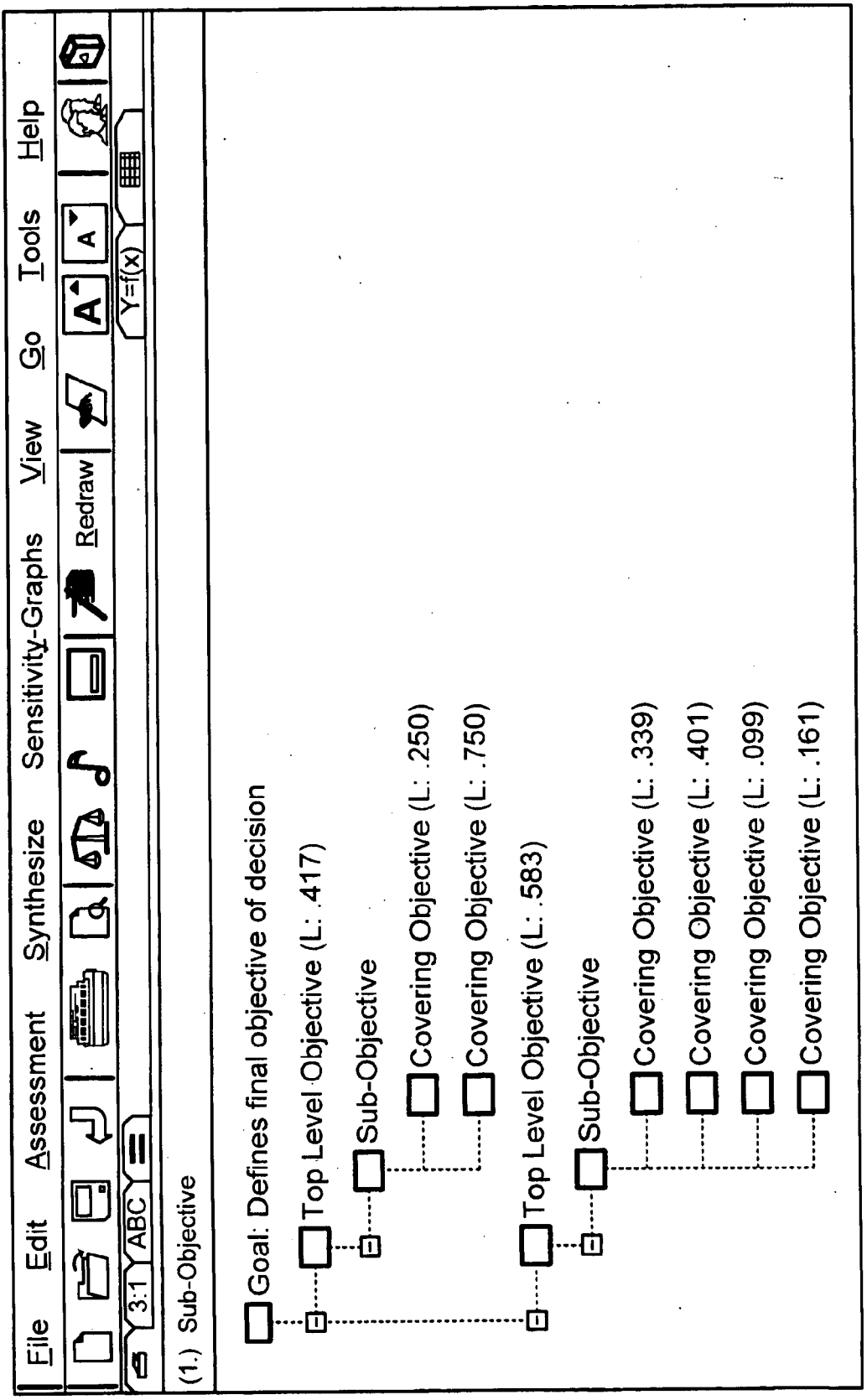
FIG. 10 illustrates a tab-driven interface choice.
Figure 11:
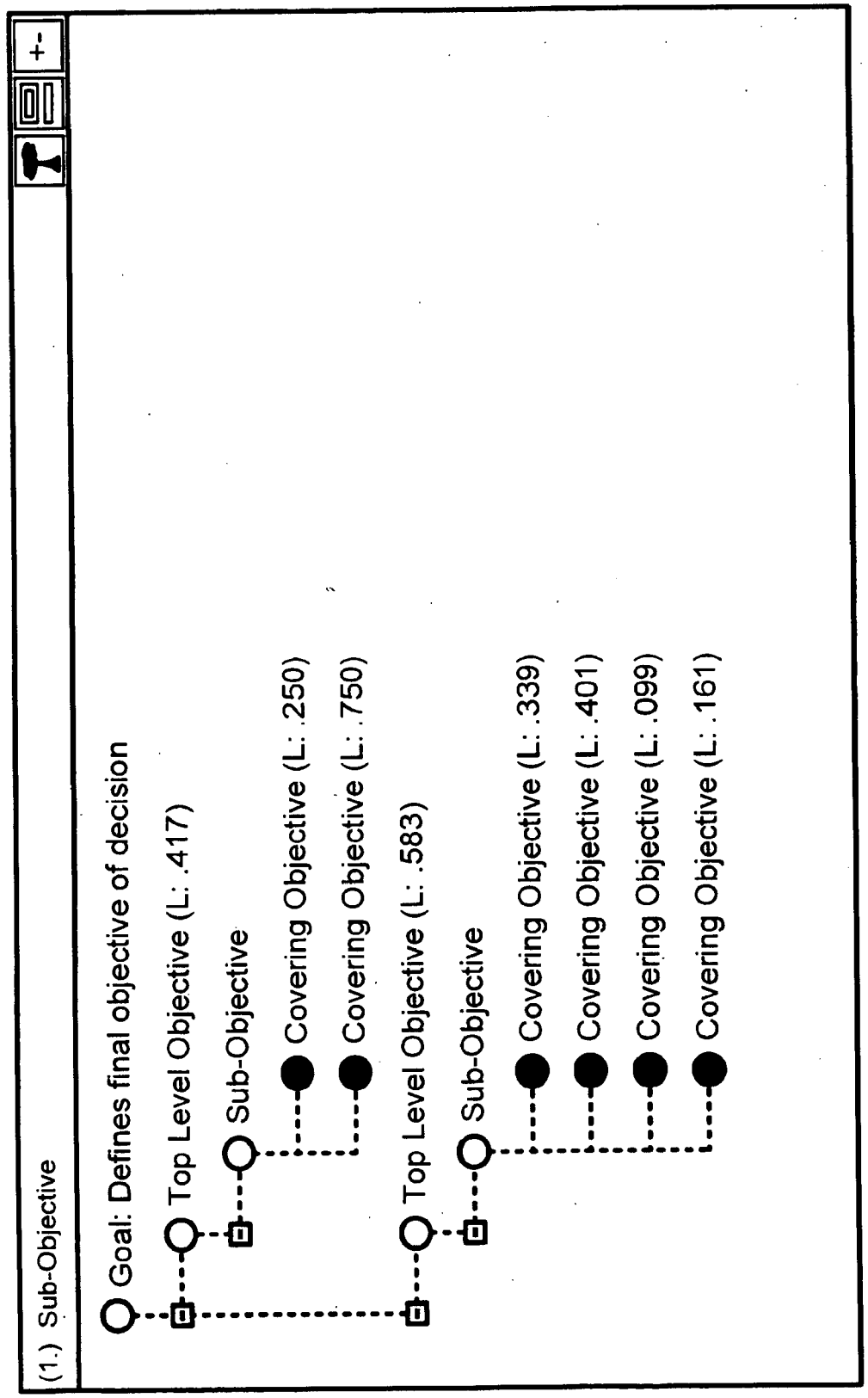
FIG. 11 illustrates direct construction of a hierarchy.
Figure 12:
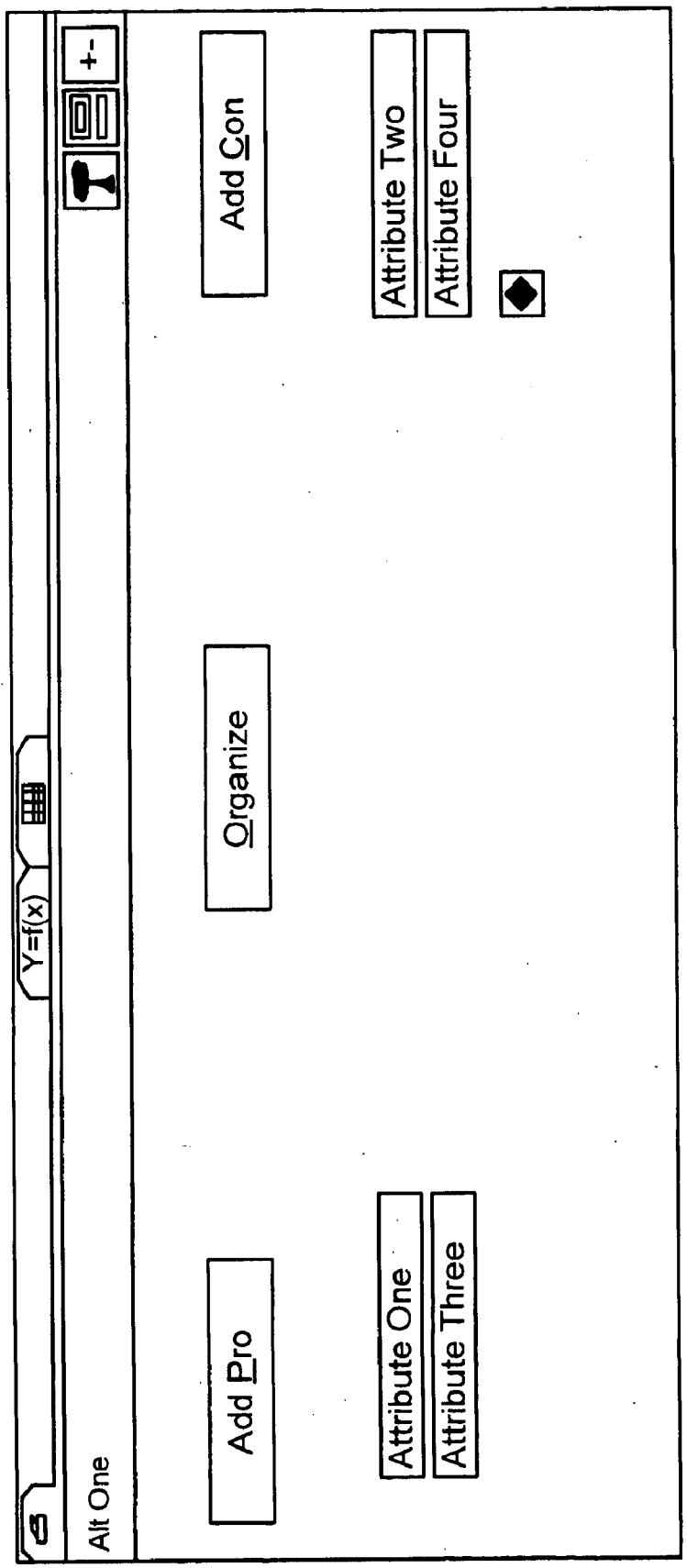
FIG. 12 depicts a pros and cons screen.

FIG. 3 shows the key elements necessary for a user to build a hierarchy. The user has the option of selecting which interface to use to build the hierarchy. At step 301, the user chooses to construct the hierarchy directly either from a top down or bottom up perspective (see FIG. 11) or using the "Pros and Cons" interface (see FIG. 12). Pros and Cons captures verbal factors in an affinity-diagraming format which assists in logical grouping at step 302, while Direct allows for free-form drag-and-drop construction at step 303. All results are a stored in a database (see FIG. 9).

Figure 4:
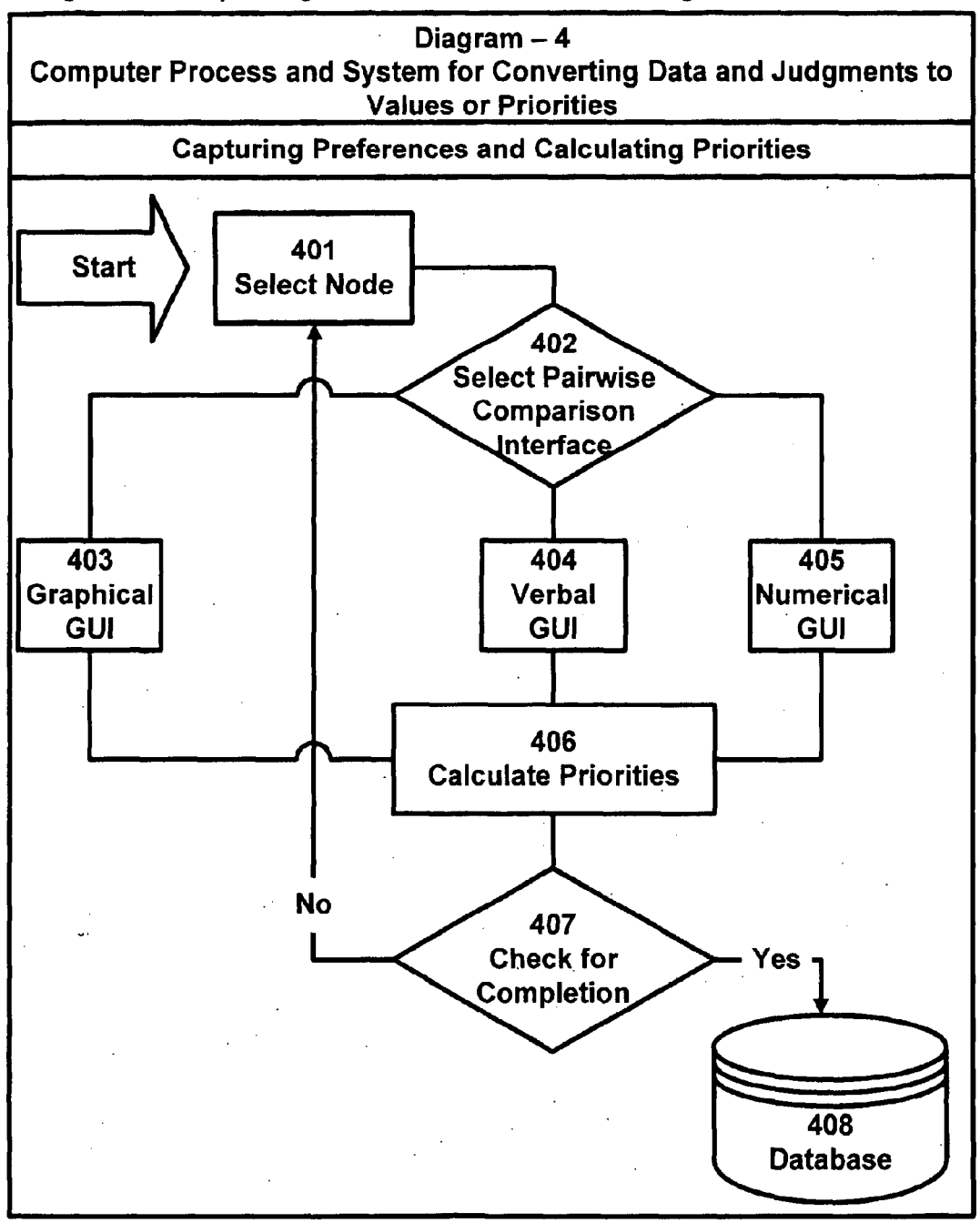
FIG. 4 illustrates capturing preferences and calculating priorities in a preferred computer process and system for converting data and judgments to values or priorities.
Figure 13:
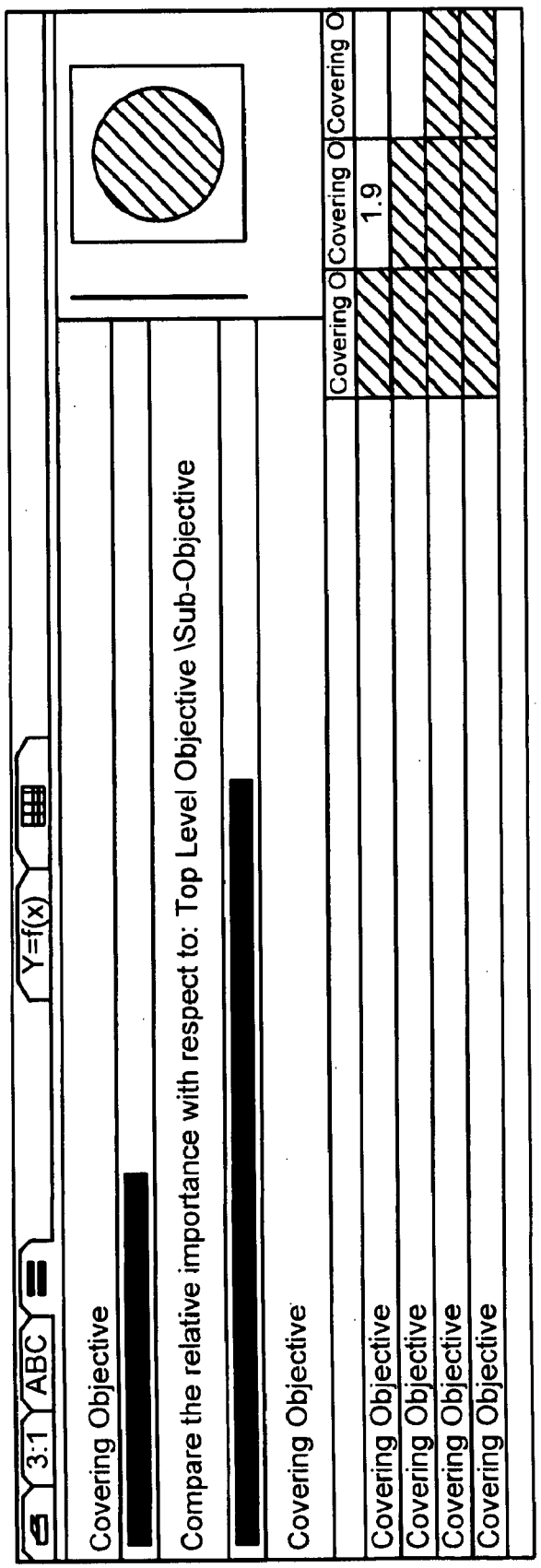
FIG. 13 illustrates graphical pair-wise assessment.
Figure 14:
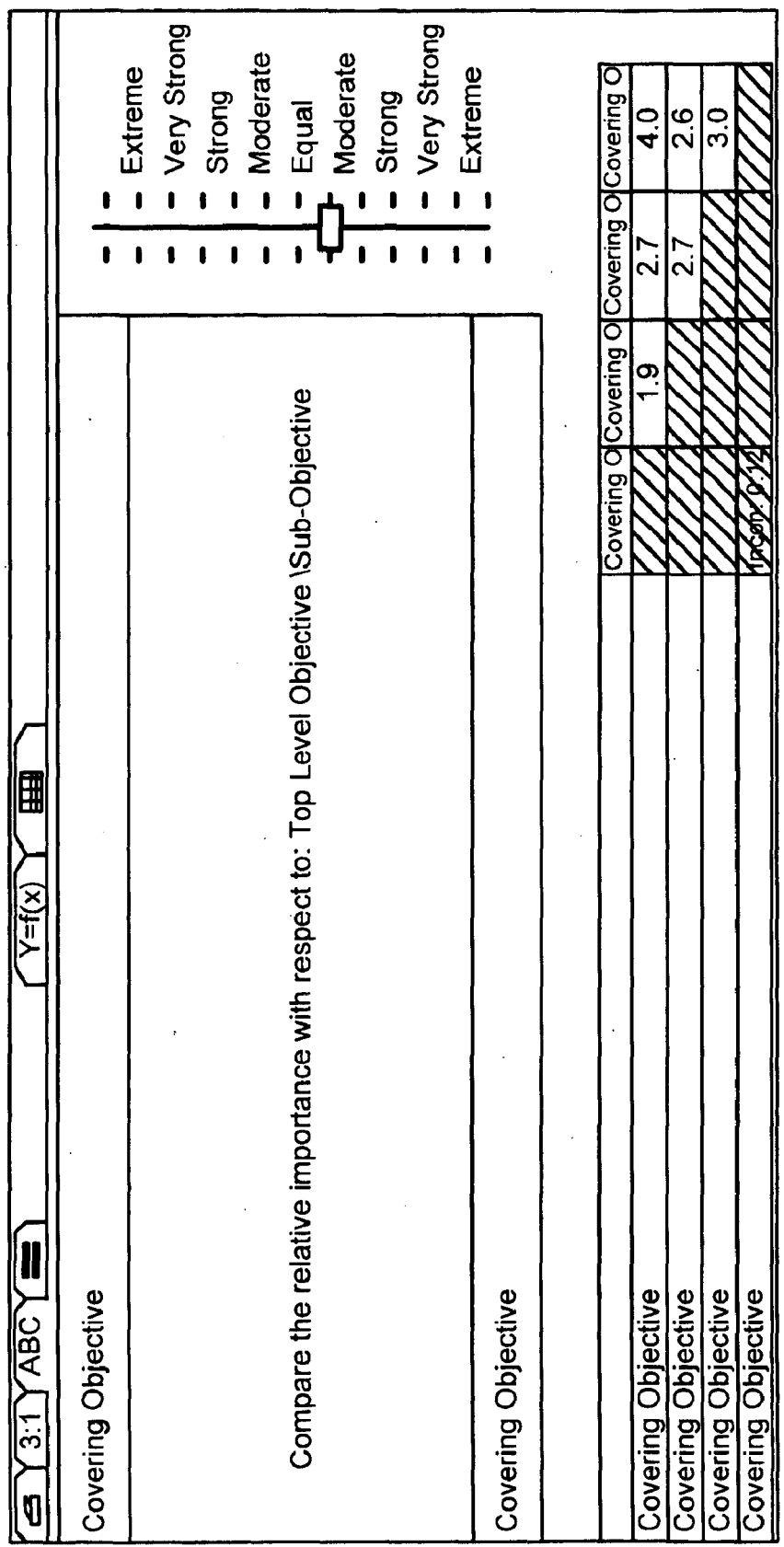
FIG. 14 illustrates verbal pair-wise assessment.
Figure 15:
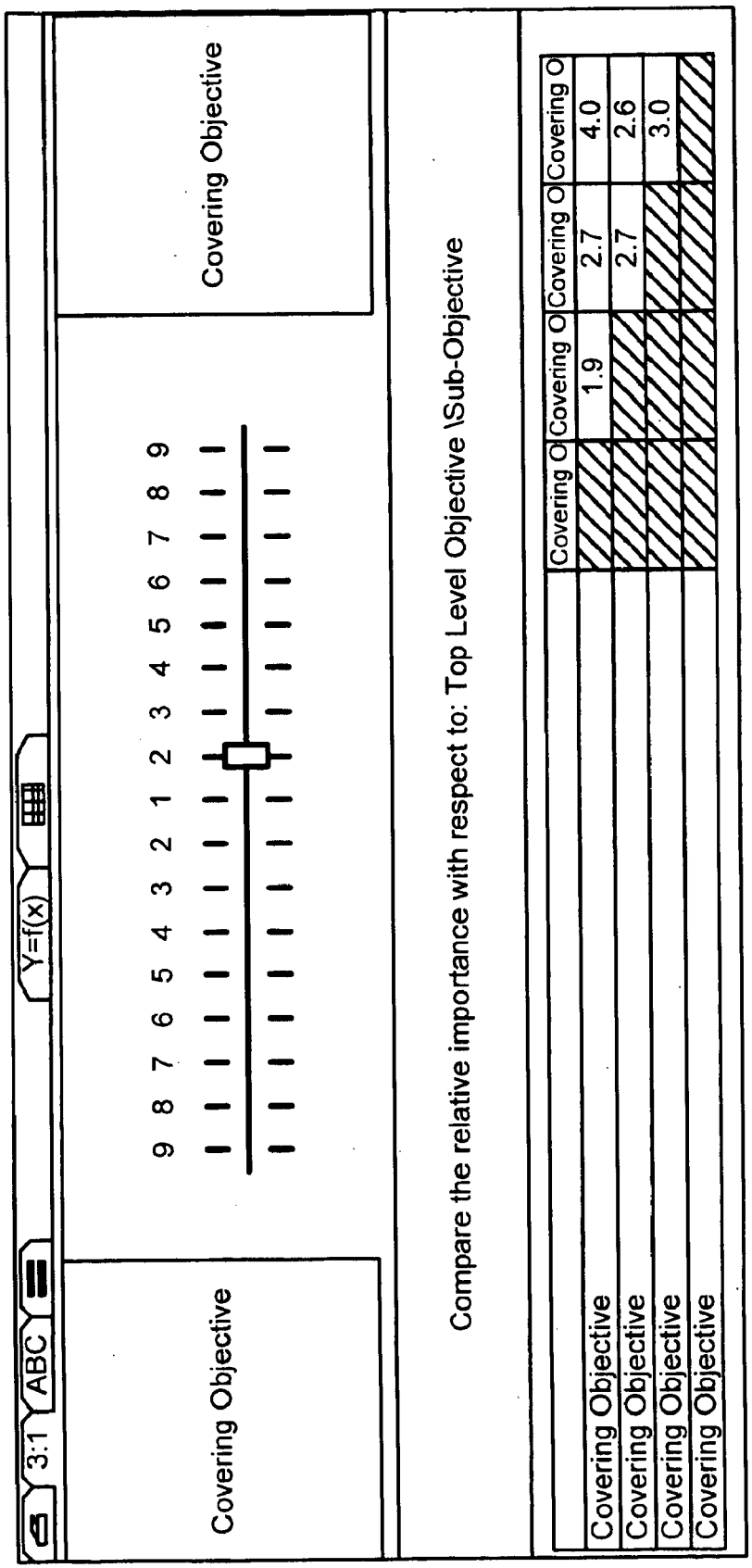
FIG. 15 illustrates numerical pair-wise assessment.

FIG. 4 illustrates the computer interface process for accepting a user's judgments by allowing the user to make comparisons on one-to-one sets of objectives that are at the same depth on a branch of the decision hierarchy. A user may start the process at any node; there are no dependencies on the order in which nodes and their respective children must be judged. At step 401, selection is done by highlighting the appropriate node. The user is then presented at step 402 with the option of selecting one of three comparison interfaces: a Graphical GUI, a Verbal GUI, or a Numerical GUI. At step 403 a Graphical GUI (see FIG. 13) is chosen that comprises two parallel horizontal bars which when dragged represent the relative importance by the difference in length. At step 404 a Verbal GUI (see FIG. 14) is chosen that comprises a vertical slider with way-points assigned to common verbal intensives used to represent preference. At step 405 a Numeric GUI (see FIG. 15) is chosen that comprises a single horizontal slider with a value 1 at the fulcrum and a set of intervals moving out from it. The further to one side the slider is moved, the greater the magnitude of preference or importance. The results of all pair-wise comparison interfaces are the same: a series of matrices populated with the resulting ratios. These matrices are then used at step 406 to calculate the user's priorities using AHP mathematical algorithms (shown and described in FIG. 8) (see Saaty 1980) resulting in a series of local priorities. All results are then stored in the database (see FIG. 9).

Figure 5:
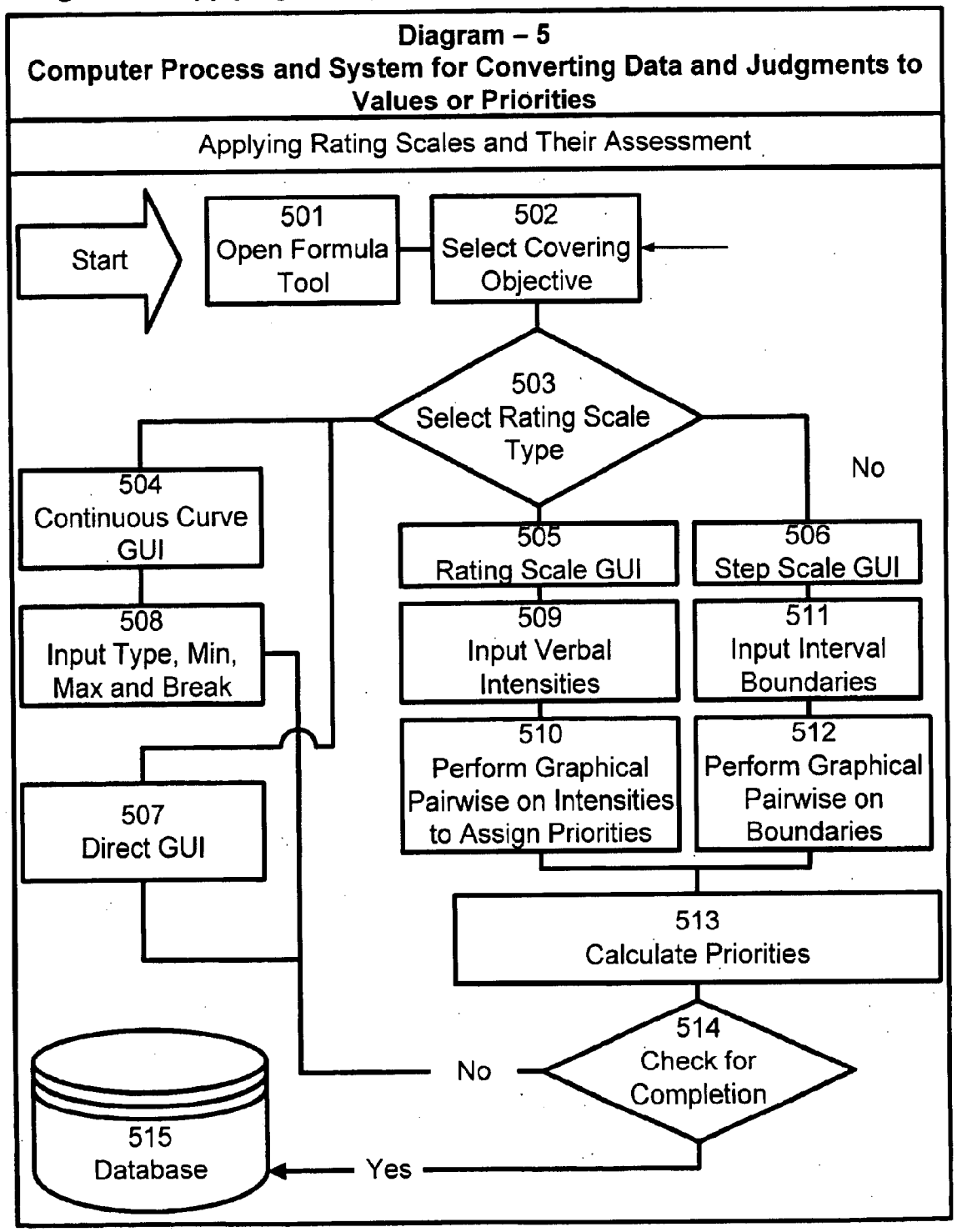
FIG. 5 illustrates applying rating scales and assessment in a preferred computer process and system for converting data and judgments to values or priorities.
Figure 16:
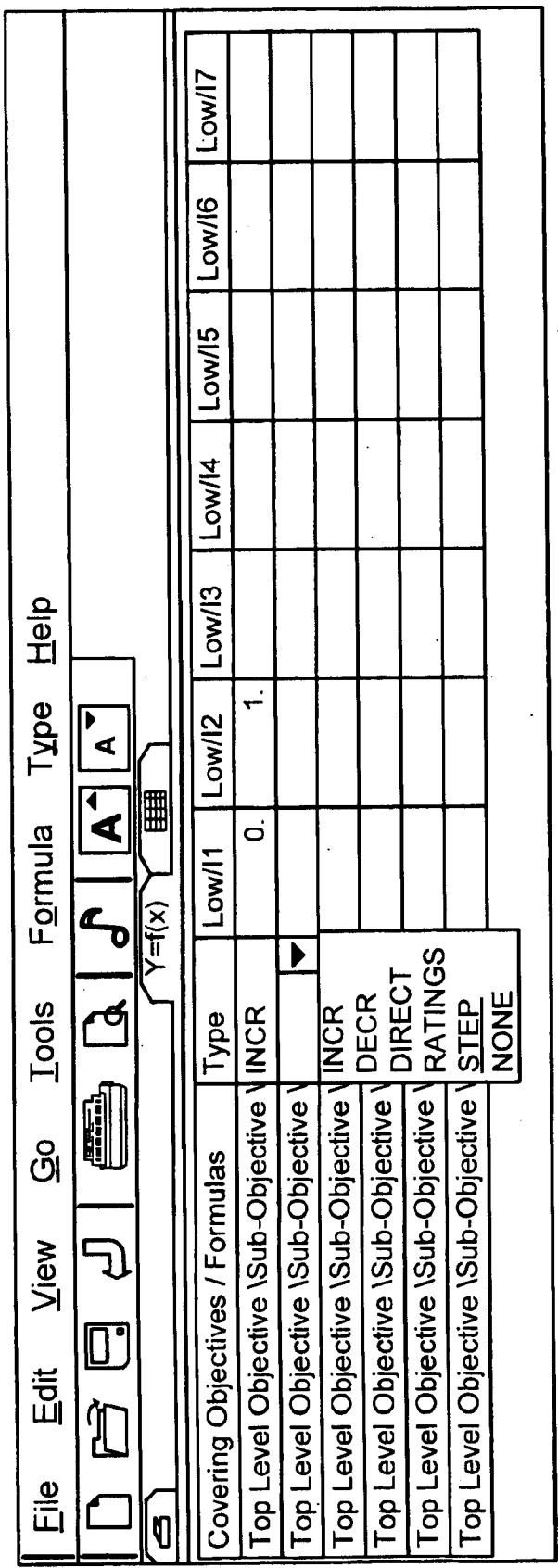
FIG. 16 depicts a formula grid with pull-down.
Figure 17:
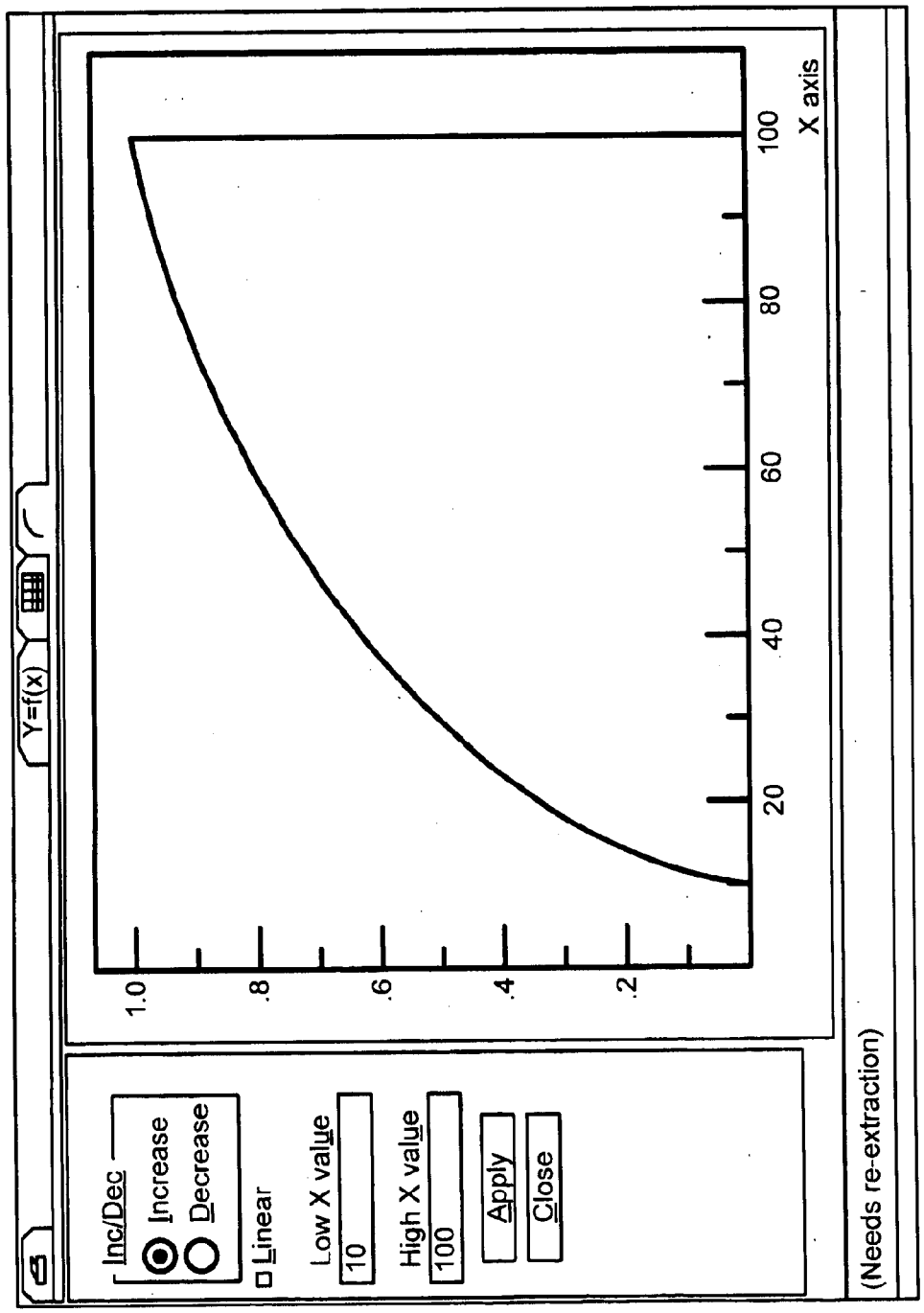
FIG. 17 depicts a curve-creating tool.

FIG. 5 illustrates data handling procedures that are the application of rating scales and assessment of the weight of their intensities. Upon opening the formula tool at step 501, the user is tasked at step 502 with selecting the covering objective that a scale is to be assigned to (see FIG. 16). This is done by activating the appropriate pull-down menu. The pull-down menu offers four choices at step 503: a continuous curve GUI (chosen at step 504), a rating scale (chosen at step 505), a step scale (chosen at step 506), or direct weights (chosen at step 507). The use of an increasing or decreasing curve at step 504 is primarily for numeric data that is continuous for a set interval, approaches infinity, or has either an upper or lower bound that is unattainable. The inputs at step 508 for the continuous curve GUI are the upper and lower bounds, a break point, and denotation of concavity or convexity (see FIG. 17). The Rating Scale GUI involves assigning verbal intensities at step 509 which correspond to subjective ratings. This is used for the classic 3, 5, 10, or n point scale (see FIG. 18). Once intensities have been defined, they are assessed at step 510. This involves the use of the graphical pair-wise interface (see FIG. 13). A step scale, chosen at step 506, is used to convert raw data that represents intervals. At step 511, the upper bounds of the intervals are input (see FIG. 19), as is the assessment of the intervals using the graphical pair-wise interface (see FIG. 13).

The results of the pair-wise assessment is calculated at step 513 using the AHP algorithms (see FIG. 8). If the data is already normalized, it may be entered directly through the Direct GUI, chosen at step 507. All covering objectives must have a corresponding scale. If there is one missing, at step 514 the user repeats the process, beginning at step 502. Otherwise, the results are stored at step 515 in a database, and the raw data points are converted to value scores.

FIG. 7 illustrates the data-transformation process step-by-step: at step 701, the raw data is extracted. At step 702, the formulas and the resultant value score are applied. (see FIG. 20).

Figure 6:
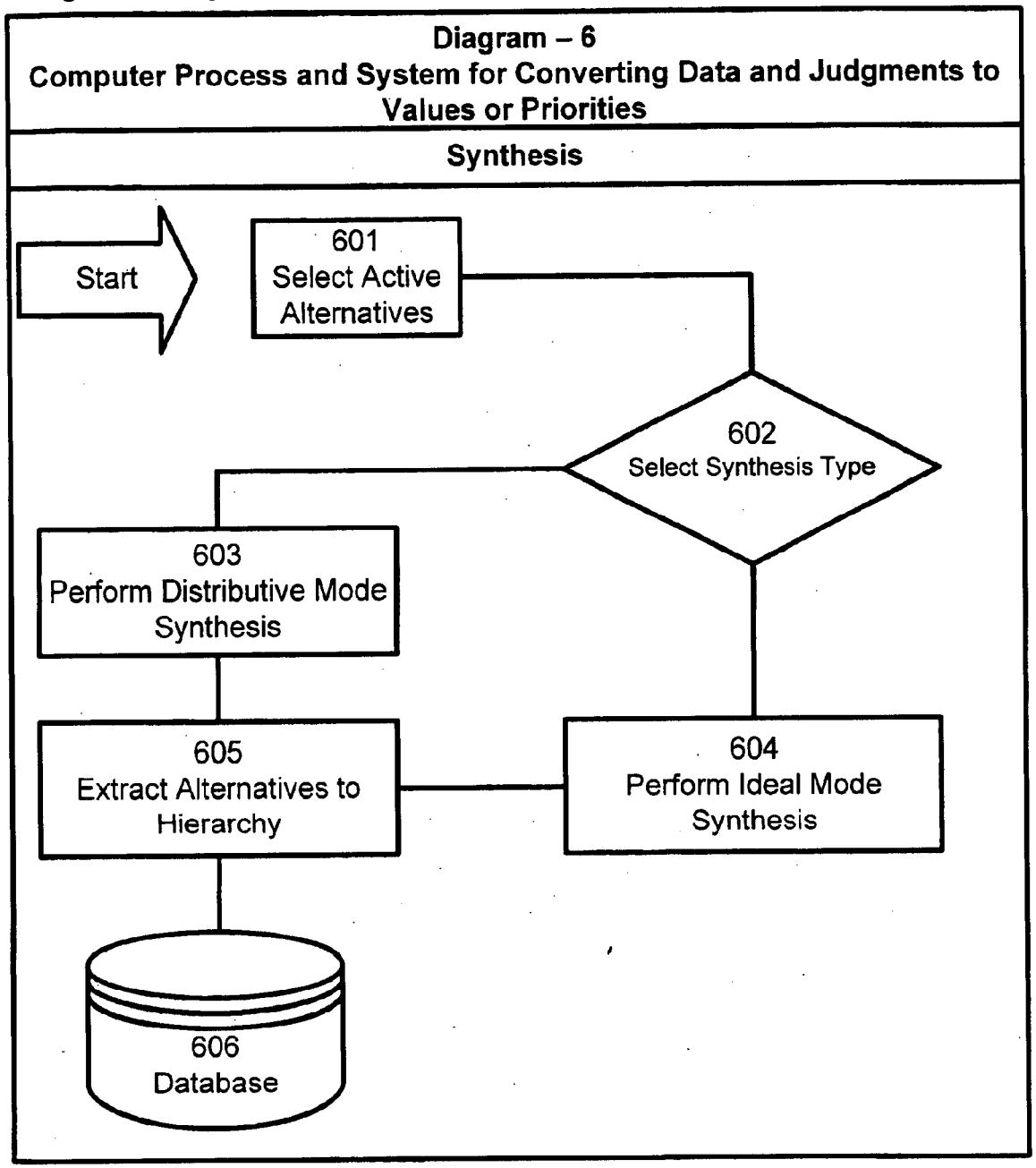
FIG. 6 illustrates synthesis in a preferred computer process and system for converting data and judgments to values or priorities.

FIG. 6 illustrates performance of synthesis and calculation of the total score. The user is given the option at step 601 of selecting which alternatives to include in synthesis and carry over to dynamic sensitivity. A dynamic sensitivity analysis emphasizes the priorities of the criteria and shows how changing the priority of one criterion affects the priorities of the alternatives. The user makes the selection by right-clicking the desired alternatives (see FIG. 21). After selecting alternatives, or accepting all, the user chooses at step 602 which type of synthesis to employ. Distributive mode synthesis, performed at step 603, is used primarily when the user desires to do a resource allocation or optimization of a set of alternatives, as opposed to selecting the highest scoring alternative, which is the purpose for ideal mode synthesis (performed at step 604).

Distributive mode synthesis (shown in matrix 704) determines the alternative priorities by multiplying the priorities from the goal down to each alternative, and adding for each alternative. A "supermatrix" calculation approach, as is known in the art, is also employed. Ideal mode synthesis is similar to the distributive approach, except that within each cluster of alternatives, the alternative with the highest priority receives all of the weight of the parent, and each of the other alternatives receives a priority in proportion to the ratio of the alternative's priority to the highest priority. Another way of looking at the ideal mode of synthesis is that each cluster of alternatives is normalized with respect to the alternative that received the highest priority. This process is then carried on, down the tree.

After summing the priorities for each alternative with respect to all the covering objectives, the priorities are normalized so that they sum to one. The user can choose to extract at step 605 only the active alternatives that will derive a total value score for a set of alternatives. These can be used for analysis, allocation or optimization. The results (shown in matrix 705) are stored in a database 606.

Figure 22:
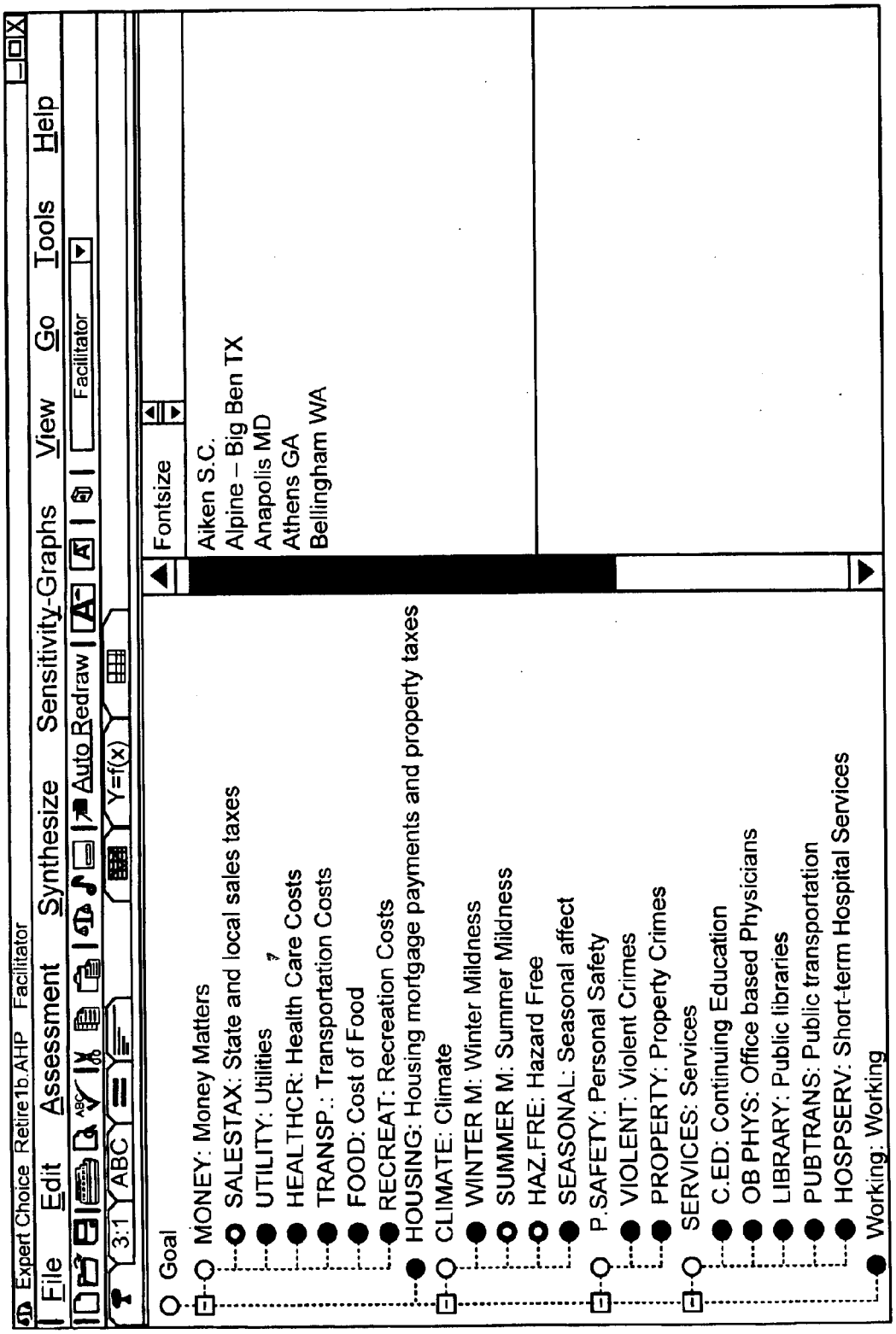
FIG. 22 depicts a treeview comprising a pane displaying a decision hierarchy.

A preferred Decision Hierarchy comprises a Root element, typically called the Goal, which has children elements, typically called objectives or criteria, which can in turn have sub-objectives and so on. A view of a decision tree is shown in FIG. 22, contains a pane displaying the decision hierarchy as well as other panes that contain alternatives and objects such as information documents, pictures, slideshows, etc.

If alternatives appear in the decision hierarchy below the lowest level sub-objectives, the hierarchy is called an incomplete hierarchy, because the same alternatives need not appear under each lowest level sub-objective. If no alternatives appear in the decision hierarchy, but instead appear in the active alternatives grid pane of the treeview window, the alternatives are treated as appearing under each of the lowest level sub-objectives and the hierarchy is referred to as a complete hierarchy. These alternatives are called "active" alternatives; there may be inactive alternatives, as described below.

Priorities are derived for clusters of objectives, sub-objectives, sub-sub-objectives, etc., through the alternatives via pair-wise comparisons. The pair-wise comparisons indicate both direction and intensity, and can be made in either verbal, numerical, or graphical modes. The graphical mode requires examining and dragging the lengths of two bars so that the relative lengths of the two bars indicates the decision maker's judgment about the relative importance, preference, or likelihood of the two elements. The judgments are typically made using a computer. They can be made off-line and then subsequently entered. Off-line graphical comparisons can be made using a "ratio ruler" (see U.S. Pat. No. 6,067,719, to Forman, the contents of which are incorporated herein by reference). Redundant judgments (judgments more than the minimum spanning set necessary to mathematically calculate priorities for the set of elements in a cluster) can be made to increase accuracy. A synthesis can be performed to ascertain the overall alternative priorities. Sensitivity plots (enumerated below) can be performed.

Each alternative in the active alternatives set is also a global alternative and appears in the data and values grids, described below. In addition to active alternatives, inactive alternatives can be defined, and these too appear in the data grid, described below. All alternatives, both active and inactive, appear in the data and values grids and are referred to as Global alternatives. Alternatives' priorities can be determined for the active alternatives appearing in the decision hierarchy, and/or the global alternatives in the data grid. We treat the active alternatives next, and the global alternatives below.

Priorities for the active alternatives, with respect to the lowest level objectives in the decision hierarchy (covering objectives), are determined from the normalized right-hand eigenvector of a spanning set of pair-wise judgments of the alternatives, with respect to the covering objective. One or more active elements can be made "dormant" with respect to any given covering objective. Priorities of the covering objectives are determined in a similar manner, through pair-wise comparisons of the covering objectives with respect to their parent objective in the hierarchy, and so on up through the objectives below the goal node. A synthesis is performed to calculate the overall alternative priorities in either of two modes: ideal and distributive.

Figure 23:
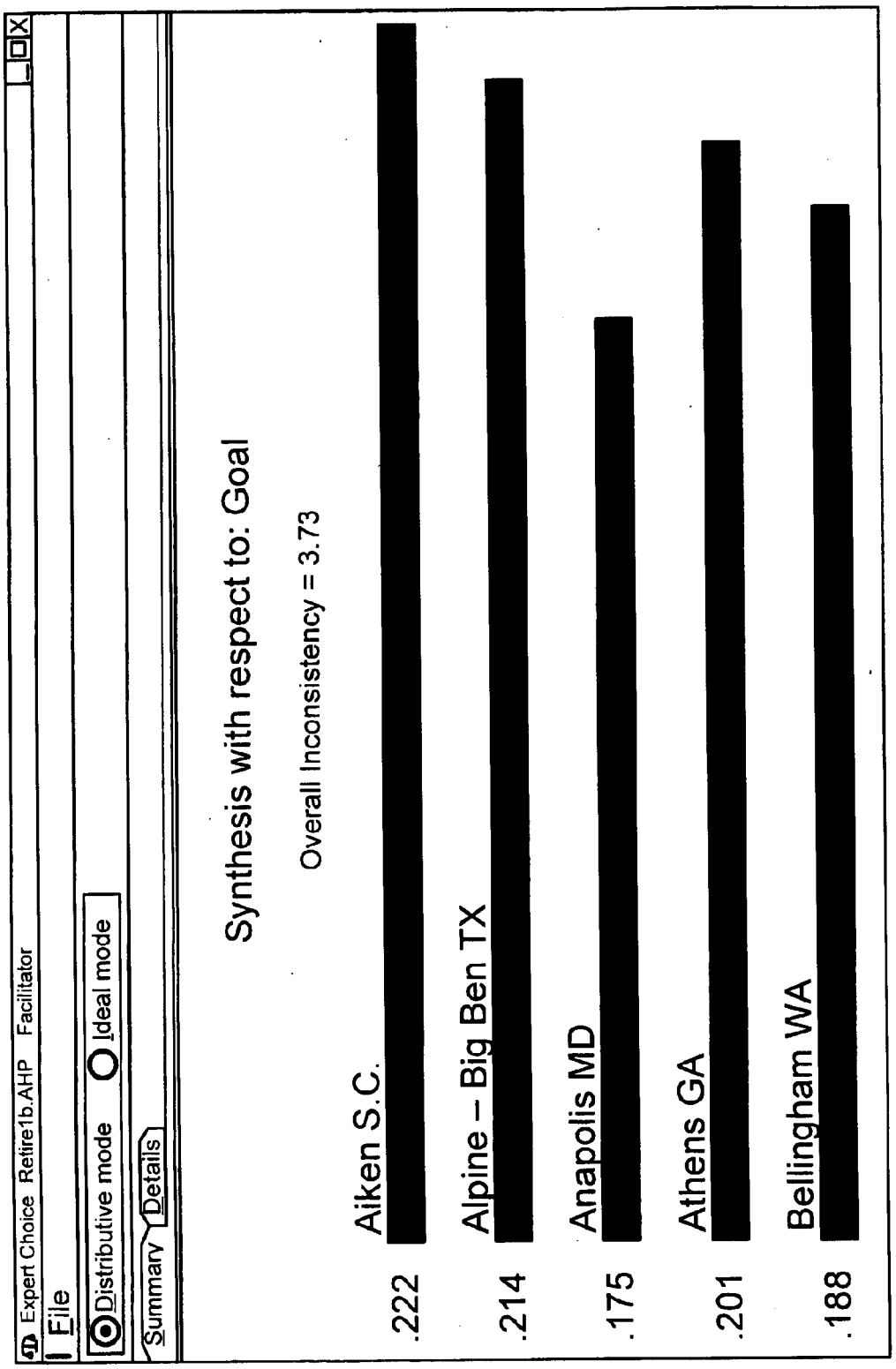
FIG. 23 illustrates distributive mode synthesis.

The distributive mode synthesis (see FIG. 23) determines the alternative priorities either by multiplying the priorities from the goal down to each alternative, and adding for each alternative. A "supermatrix" calculation approach is also employed. The ideal mode is similar to the distributive approach with the exception that within each cluster of alternatives, the alternative with the highest priority receives all of the weigh of the parent—each of the other alternatives receiving a priority in proportion to the ratio of the alternative's priority. For example, after summing the priorities for each alternative with respect to all the covering objectives, the priorities are normalized so that they sum to one. The result would give the highest scoring alternative (assume, e.g., that the original score was 0.67898) a normalized score of 1.0, while each of the other alternatives' scores would be divided by the top scoring alternative's original score (0.67898), resulting in a percentage score in proportion to the difference in the original raw scores.

Sensitivity analyses can be performed for the active alternatives. Preferred types of sensitivity analysis comprise: dynamic, performance, gradient, differences (head to head), and two-dimensional.

Figure 24:
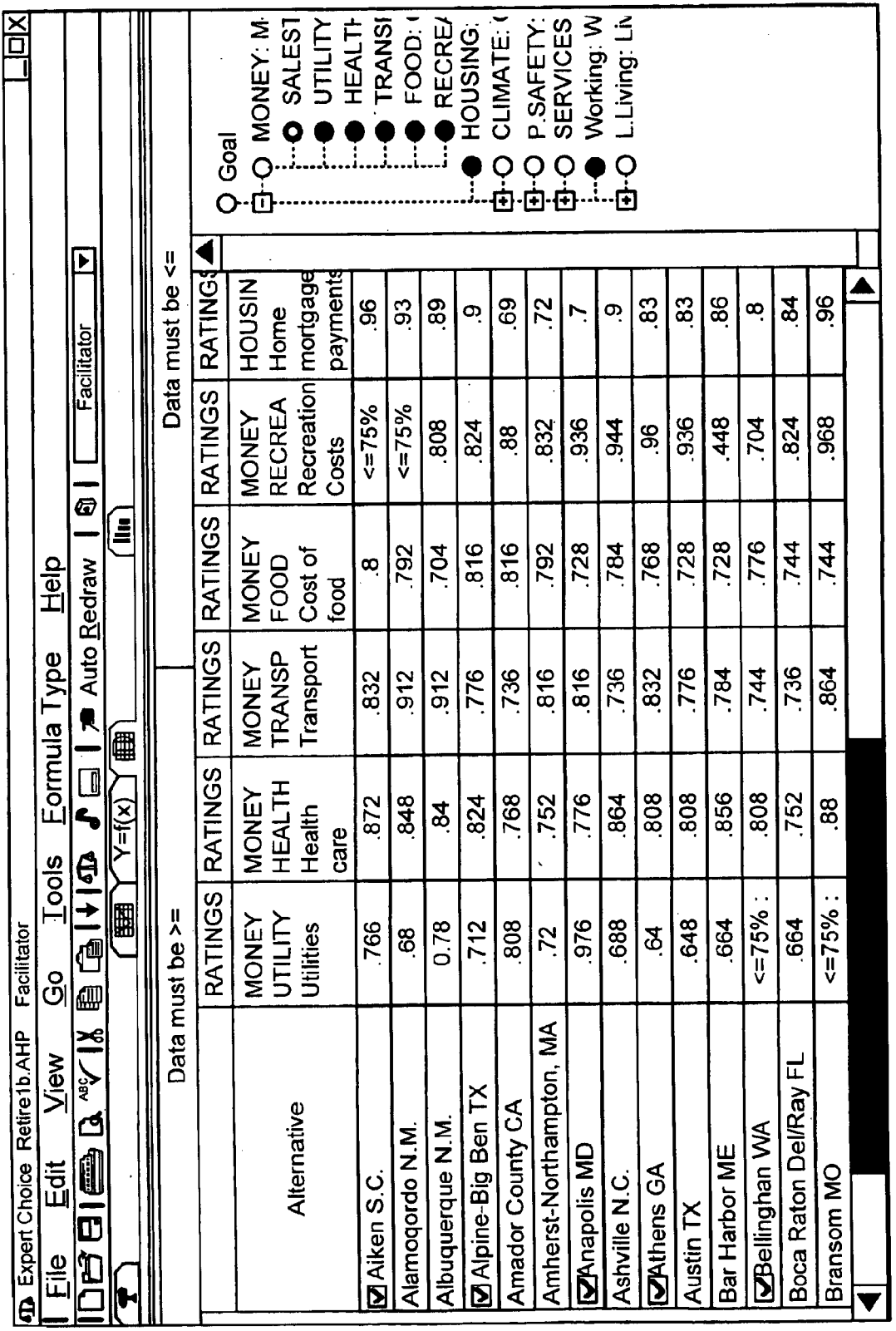
FIG. 24 depicts a data grid.

Conversion of data to values via formulas is done using a data grid, an example of which is depicted in FIG. 24, one row for each global alternative. (Each alternative in the data grid is by definition a global alternative.) A subset of the global alternatives can be extracted to the decision hierarchy, where they also become active alternatives. Priorities for a global alternative can be derived in the data grid as described below. Priorities for an active alternative can be derived in the decision hierarchy as described above.

The terms and unique elements associated with this process are as follows:

One column for each "covering," or lowest level, objective on a branch in the decision hierarchy.

Cells—data for each alternative with respect to each covering objective. The type of data depends on the formula type for the covering objective (described below).

Figure 25:
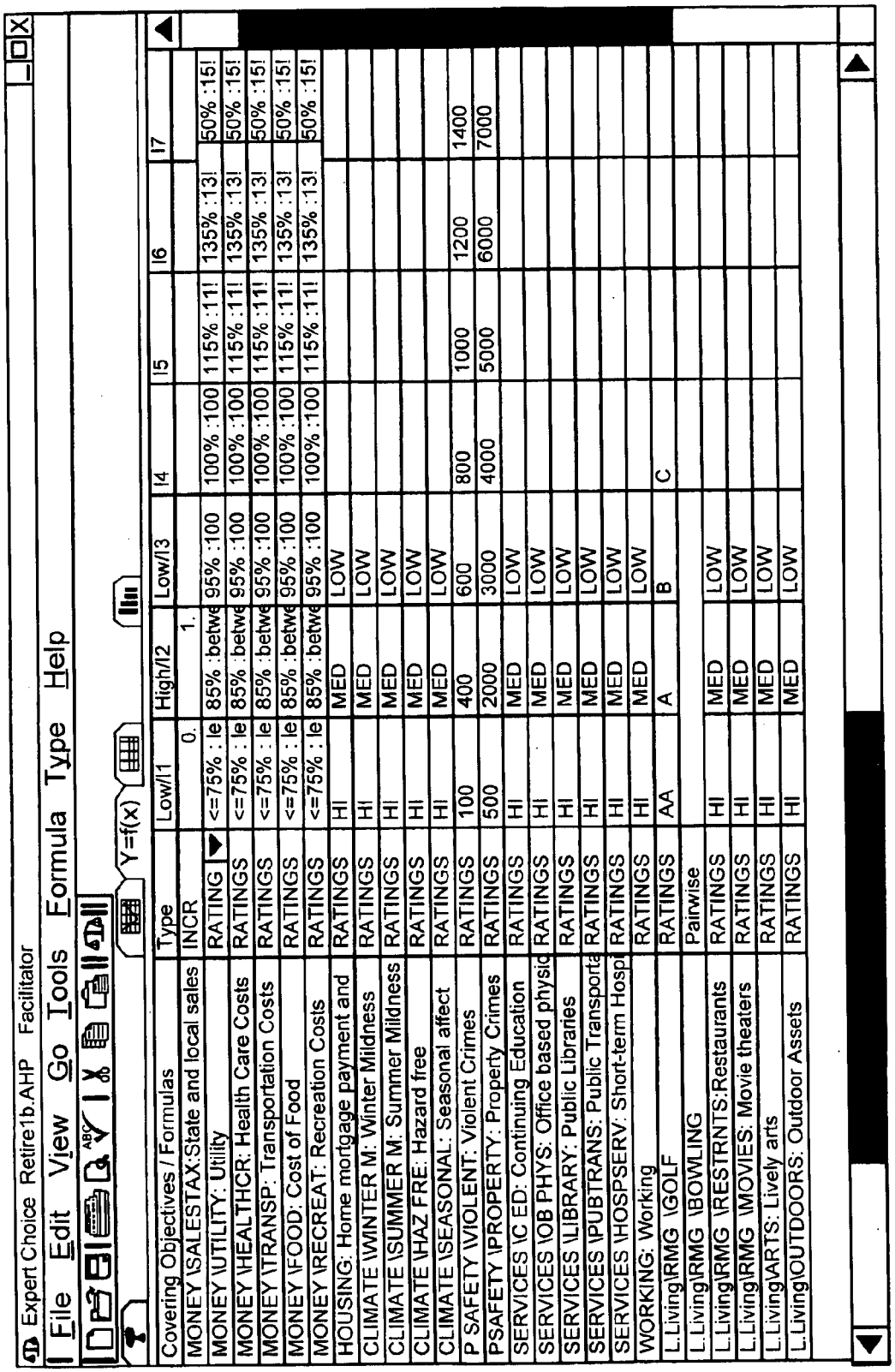
FIG. 25 depicts a formula grid.

A Formula Grid, an example of which is depicted in FIG. 25, has a slightly different set of terms and elements and are set forth below:

One row for each covering objective (corresponding to columns in the data grid).

Columns contain formula parameters; type of formula; low boundary; high boundary; other parameters depending on formula type.

A Values Grid, an example of which is depicted in FIG. 26, has the following terms and elements:

One row for each alternative (as for the data grid)

One column for each covering objective in the decision hierarchy (as for the data grid).

Cells—values from 0 to 1 representing transformation of corresponding cells in the data grid by the formula in the formula grid corresponding to the cell column.

Figure 27:
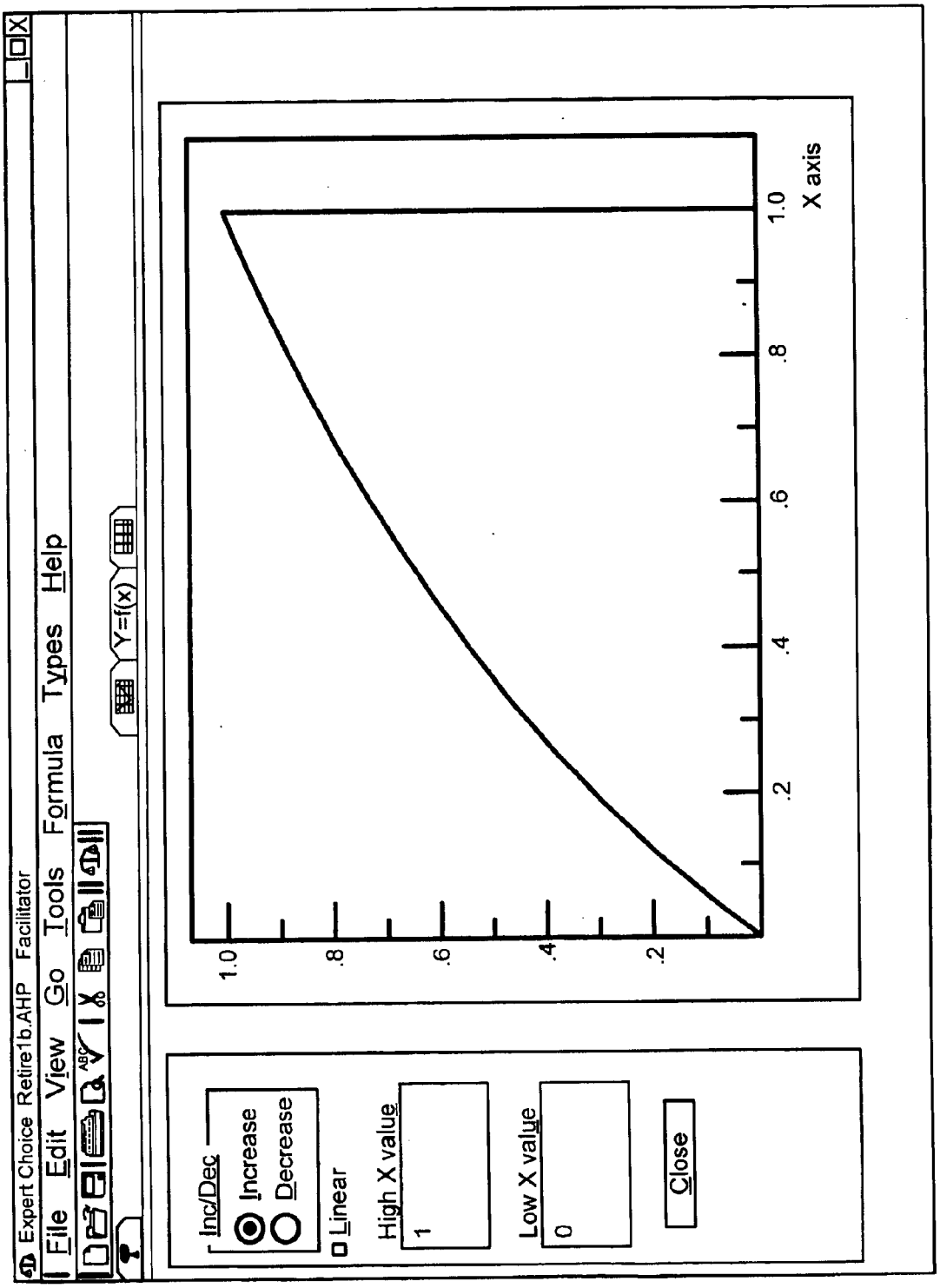
FIG. 27 depicts a curve-creating tool.

Formula types found in the formula grid comprise: (a) increasing/decreasing linear; and (b) increasing/decreasing non-linear, convex and concave (see FIG. 27) The formula type specifies: (a) Increasing or Decreasing; (b) Low boundary value; (c) High boundary value; and (d) Shape parameter (for convexity or concavity).

Terms and elements comprise:

Cell Data below the Low boundary are mapped into a value of 0 for increasing functions and 1 for decreasing functions Data above the High boundary are mapped into 1 for increasing functions and 0 for decreasing functions.

Cell data between the Low and High boundaries are mapped according to the linear, convex, or concave function specified.

Ratings (see FIG. 28) encompass verbal intensities such as Outstanding, Very Good, Good, Fair, etc. Priorities for the intensities are derived by pair-wise comparisons. The priorities are normalized such that the largest is 1 and the others are a ratio based on the results of the pair-wise comparisons. Verbal intensities are entered in cells in the data grid and are transformed into priorities ranging from 0 to 1.

Figure 29:
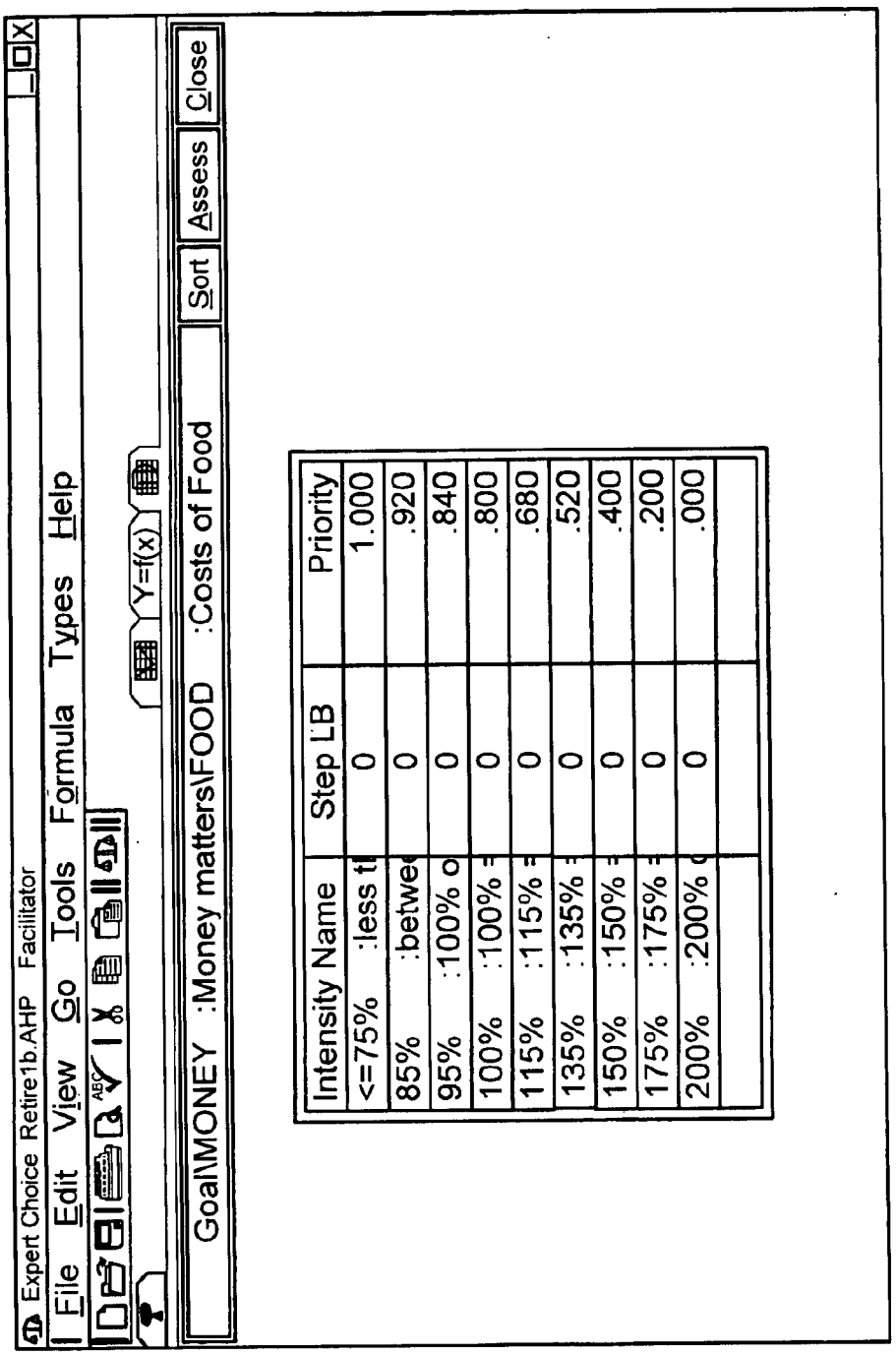
FIG. 29 depicts a step rating screen.

Step rating intensities and priorities (see FIG. 29) are like Ratings above, but in addition each intensity is bounded by a "numeric lower bound" such that when the intensities are ordered in an increasing lower bound sequence, data in a cell is mapped into the highest intensity whose lower bound is not above the data value.

Direct priorities, either from pair-wise comparisons or from a values grid (FIG. 26) are priorities, between 0 and 1.0, entered directly, either by keyboard entry or by dragging with the mouse. The terms and elements are set forth below:

One row for each alternative (as for data grid).

One column for each "covering" objective in decision hierarchy (as for data grid).

Cells—values from 0 to 1, representing transformation of corresponding cells in the data grid by the formula in the formula grid corresponding to the cell column.

Figure 30:
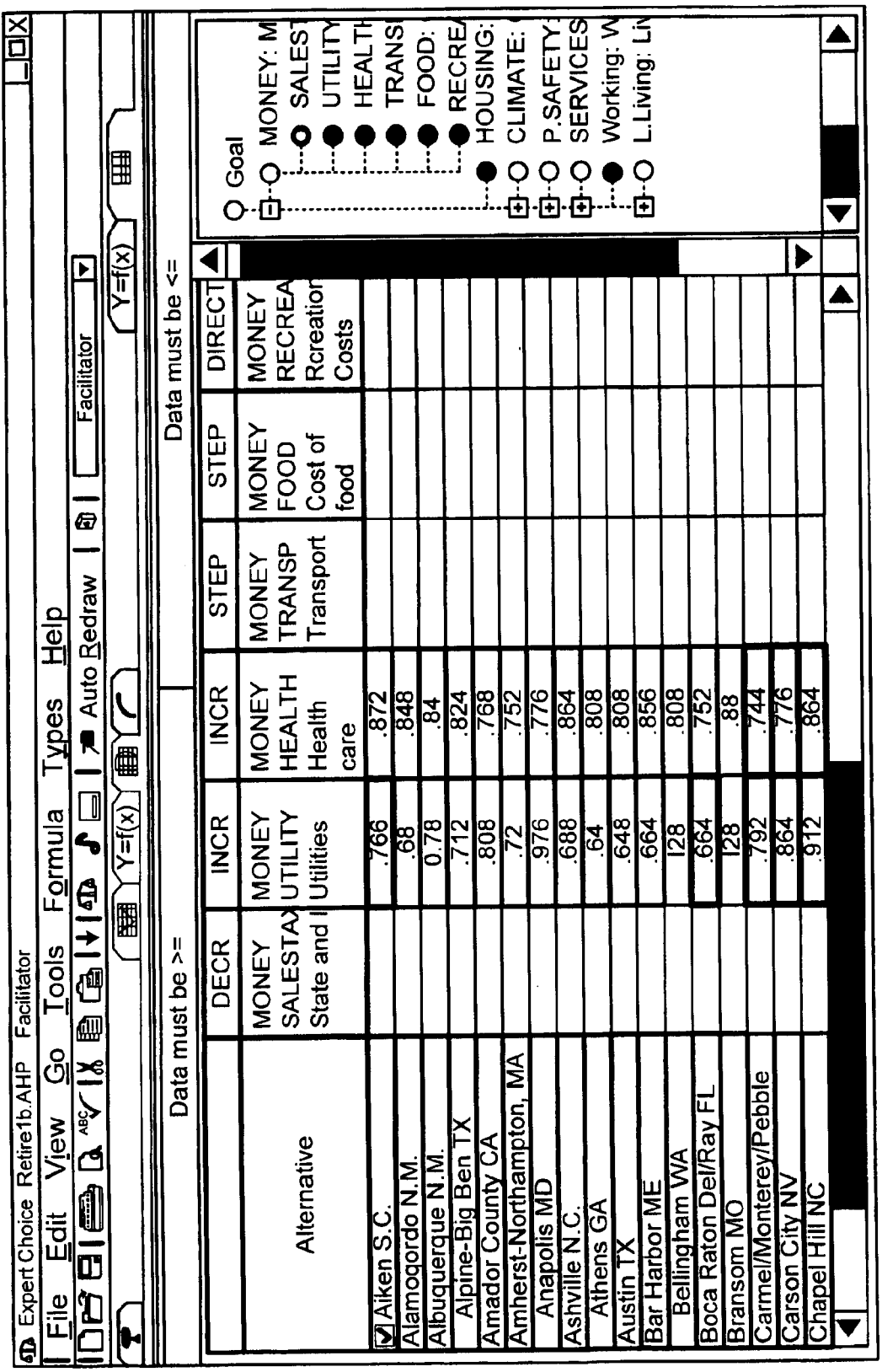
FIG. 30 depicts a data grid with normalized priorities.

Results from pair-wise comparisons can be a subset of global alternatives which are extracted to become active alternatives, and prioritized with respect to a covering objective as described below. The priorities are normalized so that the largest is 1.0 and entered in the data and values grid cells. Values can also be temporarily displayed in the data grid, replacing the display of data values upon user request (see FIG. 30). Colored bars whose lengths represent the values of the cells, appear in both data and values grids. A zero length corresponding to a value of zero, and a bar completely covering the cell corresponding to a value of 1.0.

Prioritizing global alternatives in the data and values grids involves priorities for all alternatives (global set). These priorities can be determined from the data and values grids as follows. Priorities of the covering objectives (columns of the data/values grids) are determined in the same manner as in the decision hierarchy. The covering objective priority is then multiplied by the value in that column for each alternative, such value having been determined either by applying a formula to data (discussed above), or from pair-wise comparisons of the alternatives in sets or subsets (discussed below). The "total" priority for each alternative is the sum of the priorities for all the covering objectives.

One or more alternatives from the set of global alternatives can be extracted to become the active alternatives in the decision hierarchy, where they can be pair-wise compared and synthesized, and where sensitivity analysis can be performed. This can be done by selecting the alternatives in either the data grid or the values grid and invoking the "extract" command. Ratios representing pair-wise judgments for each pair of extracted alternatives with respect to each covering objective are determined based on the type of covering objective and the values for the alternatives (which are in turn determined by applying the covering objective's formula to the alternative's data). If either element of a pair does not have a value in the values grid, then no pair-wise ratio is determined for the pair. A user can review, revise, and augment the ratios determined from the values in the values grid.

As discussed above, values for alternatives with respect to a covering objective can be determined by transforming data with one of several formula types, or by pair-wise comparisons. The pair-wise comparisons can be accomplished by extracting all global alternatives to the decision hierarchy, performing the pair-wise comparisons, and generating the priorities with the normalized right hand eigenvector of the pair-wise comparison matrix. It is not necessary to make all of the pair-wise comparisons within a set of comparisons—missing judgments are allowed as long as a spanning set of judgments exists. However, the more judgments, the more accurate the results tend to be. The number of judgments for a set of n alternatives is $n*(n-1)/2$, which gets quite large as n gets large. One way to reduce the burden of having to make too many judgments is to make only a minimal set of judgments that span the alternatives, such as across the top row of the matrix or down the diagonal that lies above the center diagonal containing judgments of 1 (representing each alternative compared to itself.) Another way to reduce the burden of having to make too many judgments is to work with "overlapping" subsets of alternatives.

Figure 31:
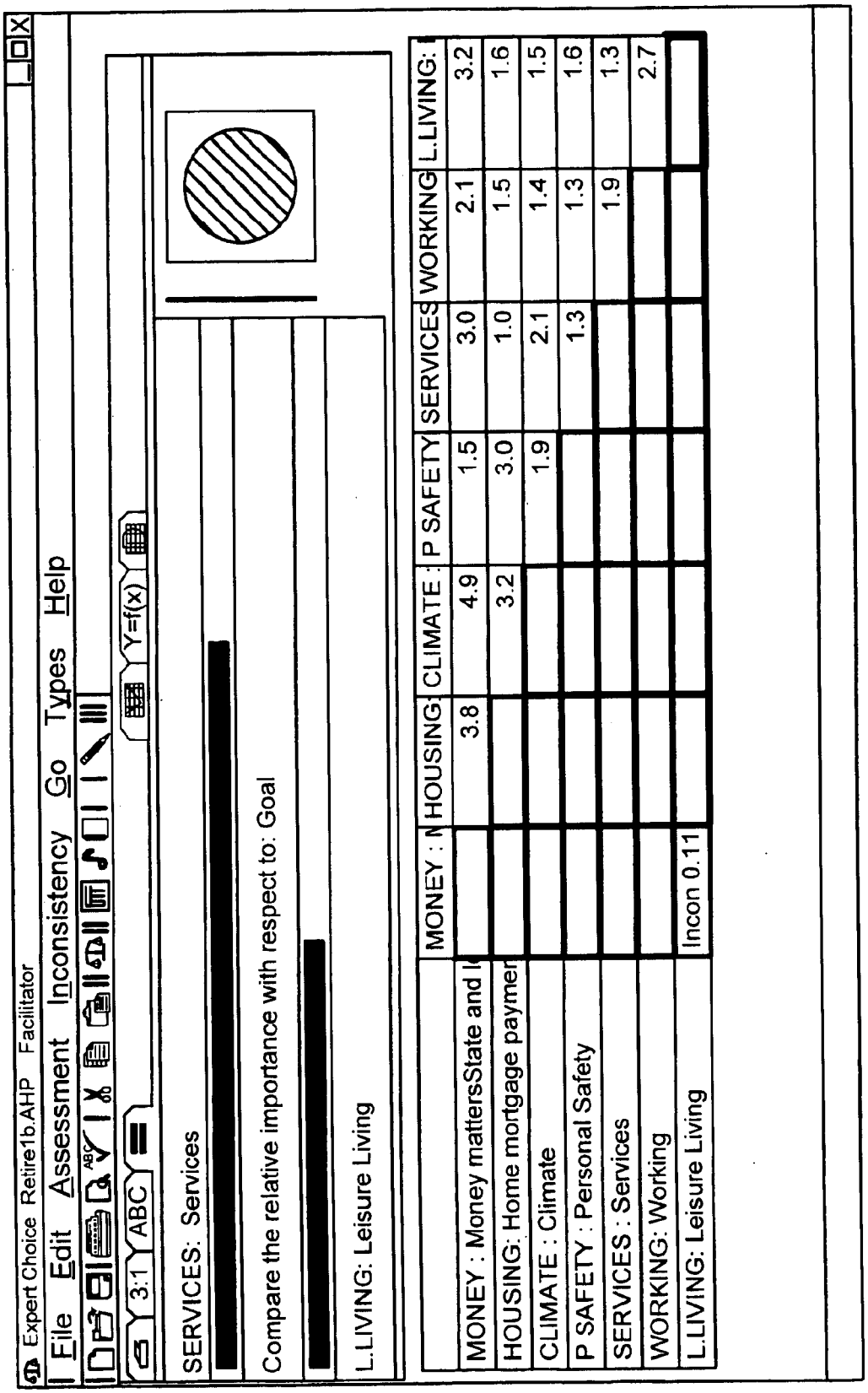
FIG. 31 depicts a comparison matrix screen.

For example, if there were 100 alternatives, a subset of elements such as 1, 2, . . . 5, 6 could be compared to calculate priorities with respect to a covering objective. Then a subset of elements 6, 7, 8, 9, 10, 11 could be compared. The decision maker sees only the comparison matrix for each set individually (see FIG. 31). If there is at least one element from each subset in common, priorities for the elements in both subsets can be calculated from the normalized right eigenvector of the pair-wise comparison matrix consisting of the elements from both sets. If there is not at least one element in common, the user is presented with a pair-wise comparison matrix consisting of the elements from both sets and must supply at least one judgment such that a spanning set of judgments is produced.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A computer-implemented method for developing a decision hierarchy for evaluating objective-related alternatives by converting raw data and judgments into value scores and priorities, comprising the steps of:
    (a) receiving data from a user describing relative levels of importance between pairs of objectives, wherein the data is in the form of pairwise comparisons indicating both direction and intensity, and can be made in either verbal, numerical or graphical modes;
    (b) storing said received data in a database in numeric ratio form;
    (c) calculating priorities for each cluster in the decision hierarchy by means of a principle right eigenvector as part of an analytic hierarchy process;
    (d) displaying said priorities to said user;
    (e) receiving rating scales from said user;
    (f) assessing said rating scales;
    (g) calculating alternative value scores;
    (h) calculating and displaying a prioritized and ranked list of global alternatives with associated value scores;
    (i) extracting a subset of the global alternatives as active alternatives, wherein all alternatives appear in a data grid but only a subset of alternatives appear in a model view of the decision hierarchy; and
    (j) performing using a computer a dynamic sensitivity analysis of the value scores by changing the priorities, wherein the dynamic sensitivity analysis is performed on the active alternatives.

2. The method according to claim 1, wherein the dynamic sensitivity analysis is performed by at least one of a performance, a gradient, a differences, and a two-dimensional analysis.

3. The method according to claim 1, wherein the rating scale is further assessed according to a table of values.

4. The method according to claim 1, wherein the alternate values scores that are below a predetermined lower bound or above a predetermined upper bound are marked as infeasible or eliminated from further evaluation.

5. The method according to claim 1, where at least sub-objectives or subordinate objectives are evaluated.

6. The method according to claim 1, further comprising: performing at least one of the steps of (a)–(j) via a computer.

7. The method according to claim 1, further comprising: performing at least one of the steps (a)–(j) via computer network.

8. The method according to claim 1, wherein the steps are performed over a computer network.

9. The method according to claim 1, further comprising the step of:
    modifying the decision hierarchy, by the user performing at least one of a dragging and dropping of a portion of any of a displayed information, wherein at least one of steps (a)–(j) is automatically repeated to account for the modified decision hierarchy.

10. The method according to claim 1, wherein step (h) further adds an ideal alternative to the global alternatives.

11. The method according to claim 10, wherein the ideal alternative is not displayed.

12. The method according to claim 1, wherein step (f) is accomplished by applying at least one of a continuous curve function, a step scale function, a non-linear function, a convex function, and a concave function.

13. The method according to claim 1, wherein step (c) further comprises:
    one or more elements in each cluster which can be made dormant so that it has no priority.

14. The method according to claim 1, further comprising:
    receiving ratings of alternatives of the rating scales received from said user, by at least one of said user and another user.

15. The method according to claim 1, further comprising deriving priorities for overlapping subsets of global alternatives.

16. The method according to claim 1 wherein the priorities are derived from a combined set of the overlapping subsets of global alternatives.

17. A system for converting data and judgments into value scores and priorities by developing a decision hierarchy for evaluating objective-related alternatives, comprising:
    displaying means for displaying information to a user;
    receiving means for receiving information from a user;
    storing means for storing the receiving information; and
    calculating means for calculating and developing the decision hierarchy, wherein
    the receiving means receives data from the user describing relative levels of importance between pairs of objectives and stores the received data in a database in numeric form, wherein the calculating means calculates priorities by means of a calculation of a principle right eigenvector as part of an analytical hierarchy process and the priorities are displayed to the user, wherein the receiving means receives rating scales from the user and the calculating means assesses the rating scales, and the receiving means receives ratings of the alternatives for each of the rating scales and calculates alternative value scores, the calculating means calculates a prioritized and ranked list of global alternatives, the list being displayed by the displaying means, the calculating means further extracts a subset of the global alternatives as active alternatives and optionally performs pairwise comparisons on the active alternatives with respect to lowest level objectives in the hierarchy, and performs a dynamic sensitivity analysis on the value scores of the active alternatives by changing the priorities of objectives in the hierarchy.

18. The system according to claim 17, wherein communication between at least one of the displaying means, the receiving means, the storing means, and the calculating means is accomplished via the Internet.

* * * * *